US012756855B2

(12) United States Patent
Sullivan et al.

(10) Patent No.: US 12,756,855 B2
(45) Date of Patent: *Oct. 6, 2026

(54) SYNTAX AND SEMANTICS FOR BUFFERING INFORMATION TO SIMPLIFY VIDEO SPLICING

(71) Applicant: Microsoft Technology Licensing, LLC, Redmond, WA (US)

(72) Inventors: Gary J. Sullivan, Bellevue, WA (US); Lihua Zhu, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/027,105

(22) Filed: Jan. 17, 2025

(65) Prior Publication Data

US 2025/0168383 A1 May 22, 2025

Related U.S. Application Data

(63) Continuation of application No. 18/775,708, filed on Jul. 17, 2024, now Pat. No. 12,549,753, which is a (Continued)

(51) Int. Cl.
*H04N 19/00* (2014.01)
*H04N 19/46* (2014.01)
(Continued)

(52) U.S. Cl.
CPC ............. *H04N 19/46* (2014.11); *H04N 19/70* (2014.11); *H04N 21/23424* (2013.01);
(Continued)

(58) Field of Classification Search
CPC .. H04N 19/46; H04N 19/70; H04N 21/23424; H04N 21/44016; H04N 19/573;
(Continued)

(56) References Cited

U.S. PATENT DOCUMENTS 8,406,292 B2 * 3/2013 Shimada .............. G11B 27/034 375/240.01
8,699,581 B2 * 4/2014 Koyabu ............... G11B 27/005 375/240.12

(Continued)

OTHER PUBLICATIONS

Notice of Allowance dated Jan. 16, 2025, from U.S. Appl. No. 18/647,524, 5 pp.

(Continued)

*Primary Examiner* — Frank F Huang

(74) *Attorney, Agent, or Firm* — Klarquist Sparkman, LLP

(57) ABSTRACT

Innovations in syntax and semantics of coded picture buffer removal delay ("CPBRD") values potentially simplify splicing operations. For example, a video encoder sets a CPBRD value for a current picture that indicates an increment value relative to a nominal coded picture buffer removal time of a preceding picture in decoding order, regardless of whether the preceding picture has a buffering period SEI message. The encoder can signal the CPBRD value according to a single-value approach in which a flag indicates how to interpret the CPBRD value, according to a two-value approach in which another CPBRD value (having a different interpretation) is also signaled, or according to a two-value approach that uses a flag and a delta value. A corresponding video decoder receives and parses the CPBRD value for the current picture. A splicing tool can perform simple concatenation operations to splice bitstreams using CPBRD value for the current picture.

20 Claims, 16 Drawing Sheets software 180 implementing one or more innovations for encoding, decoding and/or splicing of video with syntax and semantics of coded picture buffer delay values to simplify video splicing

Related U.S. Application Data continuation of application No. 18/442,948, filed on Feb. 15, 2024, now Pat. No. 12,273,550, which is a continuation of application No. 18/135,853, filed on Apr. 18, 2023, now Pat. No. 11,943,464, which is a continuation of application No. 17/946,149, filed on Sep. 16, 2022, now Pat. No. 11,665,362, which is a continuation of application No. 17/350,510, filed on Jun. 17, 2021, now Pat. No. 11,451,813, which is a continuation of application No. 16/430,087, filed on Jun. 3, 2019, now Pat. No. 11,070,832, which is a continuation of application No. 15/601,615, filed on May 22, 2017, now Pat. No. 10,313,698, which is a continuation of application No. 14/109,670, filed on Dec. 17, 2013, now Pat. No. 9,661,341.

(60) Provisional application No. 61/749,909, filed on Jan. 7, 2013.

(51) Int. Cl.

| | |
|---|---|
| ***H04N 19/70*** | (2014.01) |
| ***H04N 21/234*** | (2011.01) |
| ***H04N 21/44*** | (2011.01) |
| *H04N 7/14* | (2006.01) |
| *H04N 7/15* | (2006.01) |
| *H04N 7/18* | (2006.01) |
| *H04N 19/573* | (2014.01) |
| *H04N 19/58* | (2014.01) |

(52) U.S. Cl.
CPC ....... *H04N 21/44016* (2013.01); *H04N 7/147* (2013.01); *H04N 7/15* (2013.01); *H04N 7/18* (2013.01); *H04N 19/573* (2014.11); *H04N 19/58* (2014.11)

(58) Field of Classification Search
CPC .......... H04N 19/58; H04N 7/147; H04N 7/15; H04N 7/18
See application file for complete search history.

(56) References Cited

U.S. PATENT DOCUMENTS

| | | | | |
|---|---|---|---|---|
| 8,761,266 | B2 * | 6/2014 | Rodriguez | H04N 19/00927 375/240.27 |
| 8,886,022 | B2 * | 11/2014 | Rodriguez | H04N 5/76 386/343 |
| 2010/0074340 | A1 * | 3/2010 | Luo | H04N 21/23424 375/240.25 |
| 2010/0130136 | A1 * | 5/2010 | Sepehri-Nik | G06Q 30/02 455/67.11 |
| 2010/0167689 | A1 * | 7/2010 | Sepehri-Nik | H04M 3/5158 455/405 |
| 2013/0272430 | A1 * | 10/2013 | Sullivan | H04N 19/70 375/240.26 |

OTHER PUBLICATIONS

Notice of Allowance dated Jan. 23, 2025, from U.S. Appl. No. 18/442,948, 5 pp.
Office Action dated Jan. 30, 2025, from U.S. Appl. No. 18/647,431, 88 pp.
Notice of Allowance dated May 21, 2025, from U.S. Appl. No. 18/647,431, 5 pp.
Notice of Allowance dated Jul. 23, 2025, from U.S. Appl. No. 18/775,708, 10 pp.
Notice of Allowance dated Nov. 26, 2025, from U.S. Appl. No. 18/775,708, 9 pp.
Office Action dated Jan. 27, 2026, from U.S. Appl. No. 19/026,937, 37 pp.
Office Action dated Jan. 27, 2026, from U.S. Appl. No. 19/026,979, 47 pp.
Office Action dated Feb. 9, 2026, from U.S. Appl. No. 19/027,058, 37 pp.
Notice of Allowance dated Jun. 30, 2026, from U.S. Appl. No. 19/026,937, 5 pp.
Notice of Allowance dated Jul. 1, 2026, from U.S. Appl. No. 19/027,058, 5 pp.
Notice of Allowance dated Jul. 2, 2026, from U.S. Appl. No. 19/026,979, 6 pp.

* cited by examiner

Figure 8 800

| buffering_period( payloadSize ) { | **Descriptor** |
|---|---|
| **bp_seq_parameter_set_id** | ue(v) |
| if( !sub_pic_cpb_params_present_flag ) | |
| **rap_cpb_params_present_flag** | u(1) |
| **concatenation_flag** | u(1) |
| if( NalHrdBpPresentFlag ) { | |
| for( i = 0; i <= CpbCnt; i++ ) { | |
| **initial_cpb_removal_delay**[ i ] | u(v) |
| **initial_cpb_removal_offset**[ i ] | u(v) |
| if( sub_pic_cpb_params_present_flag \|\| rap_cpb_params_present_flag ) { | |
| **initial_alt_cpb_removal_delay**[ i ] | u(v) |
| **initial_alt_cpb_removal_offset**[ i ] | u(v) |
| } | |
| } | |
| } | |
| if( VclHrdBpPresentFlag ) { | |
| for( i = 0; i <= CpbCnt; i++ ) { | |
| **initial_cpb_removal_delay**[ i ] | u(v) |
| **initial_cpb_removal_offset**[ i ] | u(v) |
| if( sub_pic_cpb_params_present_flag \|\| rap_cpb_params_present_flag) { | |
| **initial_alt_cpb_removal_delay**[ i ] | u(v) |
| **initial_alt_cpb_removal_offset**[ i ] | u(v) |
| } | |
| } | |
| } | |
| } | |

Figure 9 900

| pic_timing( payloadSize ) { | **Descriptor** |
| --- | --- |
| if( frame_field_info_present_flag ) { | |
| **pic_struct** | u(4) |
| **progressive_source_idc** | u(2) |
| **duplicate_flag** | u(1) |
| } | |
| **au_cpb_removal_delay_minus1** | u(v) |
| **pic_dpb_output_delay** | u(v) |
| if( sub_pic_cpb_params_present_flag && sub_pic_cpb_params_in_pic_timing_sei_flag ) { | |
| **num_decoding_units_minus1** | ue(v) |
| **du_common_cpb_removal_delay_flag** | u(1) |
| if( du_common_cpb_removal_delay_flag ) | |
| **du_common_cpb_removal_delay_minus1** | u(v) |
| for( i = 0; i <= num_decoding_units_minus1; i++ ) { | |
| **num_nalus_in_du_minus1**[ i ] | ue(v) |
| if( !du_common_cpb_removal_delay_flag && i < num_decoding_units_minus1 ) | |
| **du_cpb_removal_delay_minus1**[ i ] | u(v) |
| } | |
| } | |
| } | |

Figure 11 1100

| buffering_period( payloadSize ) { | **Descriptor** |
|---|---|
| **bp_seq_parameter_set_id** | ue(v) |
| if( !sub_pic_cpb_params_present_flag ) | |
| **rap_cpb_params_present_flag** | u(1) |
| **concatenation_flag** | u(1) |
| **au_cpb_removal_delay_delta_minus1** | u(v) |
| if( NalHrdBpPresentFlag ) { | |
| for( i = 0; i <= CpbCnt; i++ ) { | |
| **initial_cpb_removal_delay**[ i ] | u(v) |
| **initial_cpb_removal_offset**[ i ] | u(v) |
| if( sub_pic_cpb_params_present_flag \|\| rap_cpb_params_present_flag ) { | |
| **initial_alt_cpb_removal_delay**[ i ] | u(v) |
| **initial_alt_cpb_removal_offset**[ i ] | u(v) |
| } | |
| } | |
| } | |
| if( VclHrdBpPresentFlag ) { | |
| for( i = 0; i <= CpbCnt; i++ ) { | |
| **initial_cpb_removal_delay**[ i ] | u(v) |
| **initial_cpb_removal_offset**[ i ] | u(v) |
| if( sub_pic_cpb_params_present_flag \|\| rap_cpb_params_present_flag) { | |
| **initial_alt_cpb_removal_delay**[ i ] | u(v) |
| **initial_alt_cpb_removal_offset**[ i ] | u(v) |
| } | |
| } | |
| } | |
| } | |

SYNTAX AND SEMANTICS FOR BUFFERING INFORMATION TO SIMPLIFY VIDEO SPLICING

CROSS REFERENCE TO RELATED APPLICATIONS

This application is a continuation of U.S. patent application Ser. No. 18/775,708, filed Jul. 17, 2024, which is a continuation of U.S. patent application Ser. No. 18/442,948, filed Feb. 15, 2024, which is a continuation of U.S. patent application Ser. No. 18/135,853, filed Apr. 18, 2023, now U.S. Pat. No. 11,943,464, which is a continuation of U.S. patent application Ser. No. 17/946,149, filed Sep. 16, 2022, now U.S. Pat. No. 11,665,362, which is a continuation of U.S. patent application Ser. No. 17/350,510, filed Jun. 17, 2021, now U.S. Pat. No. 11,451,813, which is a continuation of U.S. patent application Ser. No. 16/430,087, filed Jun. 3, 2019, now U.S. Pat. No. 11,070,832, which is a continuation of U.S. patent application Ser. No. 15/601,615, filed May 22, 2017, now U.S. Pat. No. 10,313,698, which is a continuation of U.S. patent application Ser. No. 14/109,670, filed Dec. 17, 2013, now U.S. Pat. No. 9,661,341, the disclosure of which is hereby incorporated by reference. U.S. patent application Ser. No. 14/109,670 claims the benefit of U.S. Provisional Patent Application No. 61/749,909, filed Jan. 7, 2013, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards and the MPEG-1 (ISO/IEC 11172-2), MPEG-4 Visual (ISO/IEC 14496-2) and SMPTE 421M (VC-1) standards. More recently, the HEVC standard (ITU-T H.265 or ISO/IEC 23008-2) has been developed. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

One type of parameter in an encoded video bitstream is coded picture buffer removal delay ("CPBRD"). In general, a CPBRD value for a given picture specifies the nominal time at which encoded data associated with the picture is to be removed from a buffer at the decoder. When encoded data for pictures is removed at correct times, according to normal modes of operation, the decoder buffer does not overflow (which might cause loss of encoded data) or underflow (which might result in "glitching" or other disruption of continuous playback). In low-delay mode, underflow is tolerated in some circumstances, but under the non-low-delay mode (such as is typically used for broadcasting), buffer underflow is not allowed. A buffer model, conventionally called a hypothetical reference decoder ("HRD") or video buffering verifier ("VBV"), uses CPBRD values and other parameters such as rate values, buffer size values and buffer fullness values or initial buffering delay values (before playback begins) to verify that bitstreams can be decoded within the buffering resources of a decoding system, and to help a decoder to determine the timing and steps for operation of its decoding process.

In many contexts, bitstreams for different video sequences are spliced together. For example, such splicing may be used to insert a commercial or series of commercials into a television program, or to switch between different television programs. Existing approaches to signaling CPBRD values can result in burdensome and potentially difficult operations during splicing in order to adjust CPBRD values to account for the splicing. Another problem is that, although two source streams may be independently HRD-compliant, after splicing, the resulting spliced stream is not guaranteed to be HRD-compliant.

SUMMARY

In summary, the detailed description presents innovations in syntax and/or semantics of coded picture buffer removal delay ("CPBRD") values that simplify splicing operations. In particular, the innovations support splicing operations through new ways of signaling of CPBRD values for certain pictures, where such CPBRD values can simply be re-used when a bitstream or part of a bitstream for one video sequence is concatenated to another bitstream or part of another bitstream for another video sequence.

According to one aspect of the innovations described herein, a video encoder or other tool sets a CPBRD value for a given picture of a video sequence. The CPBRD value for the given picture indicates an increment value relative to a nominal coded picture buffer ("CPB") removal time of a preceding picture in decoding order, regardless of whether the preceding picture has a buffering period SEI ("BP SEI") message. The encoder or other tool then signals the CPBRD value for the given picture. The CPBRD value can be signaled according to a single-value approach in which a flag indicates how to interpret the CPBRD value, according to a two-value approach in which another CPBRD value (having a different interpretation) is also signaled, according to a two-value approach that uses a flag and a delta value, or according to another approach.

According to another aspect of the innovations described herein, a video decoder or other tool receives a CPBRD value for a given picture of a video sequence. The CPBRD value for the given picture indicates an increment value relative to a nominal CPB removal time of a preceding picture in decoding order, regardless of whether the preceding picture has a BP SEI message. The video decoder or other tool then parses the CPBRD value for the given picture. The CPBRD value can be signaled according to a single-value approach in which a flag indicates how to interpret the CPBRD value, according to a two-value approach in which another CPBRD value (having a different interpretation) is also signaled, according to a two-value approach that uses a flag and a delta value, or according to another approach.

According to another aspect of the innovations described herein, a splicing tool receives at least part of a first bitstream for a first video sequence and also receives at least part of a second bitstream for a second video sequence. A CPBRD value for a given picture of the second video sequence indicates an increment value relative to a nominal CPB removal time of a preceding picture in decoding order regardless of whether the preceding picture has a BP SEI message. The splicing tool splices at least part of the second video sequence to at least part of the first video sequence. As part of the splicing, the splicing tool concatenates all or part of the second video sequence, starting at the given picture, to the at least part of the first video sequence. The CPBRD value can be signaled according to a single-value approach in which a flag indicates how to interpret the CPBRD value, according to a two-value approach in which another CPBRD value (having a different interpretation) is also signaled, according to a two-value approach that uses a flag and a delta value, or according to another approach.

The encoding, decoding or splicing can be implemented as part of a method, as part of a computing device adapted to perform the method or as part of a tangible computer-readable media storing computer-executable instructions for causing a computing device to perform the method.

The foregoing and other objects, features, and advantages of the invention will become more apparent from the following detailed description, which proceeds with reference to the accompanying figures.

BRIEF DESCRIPTION OF THE DRAWINGS

FIGS. 8 and 9 are tables illustrating syntax for a single-value approach to signaling CPBRD values.

FIG. 11 is a table illustrating syntax for a two-value approach to signaling CPBRD values, using a flag and a delta value.

DETAILED DESCRIPTION

The detailed description presents various approaches to improving support of splicing operations by adjusting the syntax and/or semantics of coded picture buffer removal delay ("CPBRD") values. In many cases, these approaches alleviate the shortcomings of the prior approaches. In particular, the detailed description presents innovations for syntax and semantics of CPBRD values signaled in types of supplemental enhancement information ("SEI") messages in the HEVC standard or in the H.264/AVC standard. In various examples, syntax and/or semantics of buffering period SEI ("BP SEI") messages and/or picture timing SEI ("PT SEI") messages is adjusted to facilitate splicing operations.

Although operations described herein are in places described as being performed by an encoder (e.g., video encoder), decoder (e.g., video decoder) or splicing tool (e.g., video splicing tool), in many cases the operations can alternatively be performed by another type of media processing tool.

Some of the innovations described herein are illustrated with reference to syntax elements and operations specific to the HEVC standard. For example, reference is made to the draft version JCTVC-K1003 of the HEVC standard-"High Efficiency Video Coding (HEVC) text specification draft 9", JCTVC-K1003_d13, 11th meeting, Shanghai, Oct. 10-19, 2012, the disclosure of which is hereby incorporated by reference. The innovations described herein can also be implemented for other standards or formats, for example, the H.264/AVC standard, the disclosure of which is hereby incorporated by reference.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems

Figure 1:
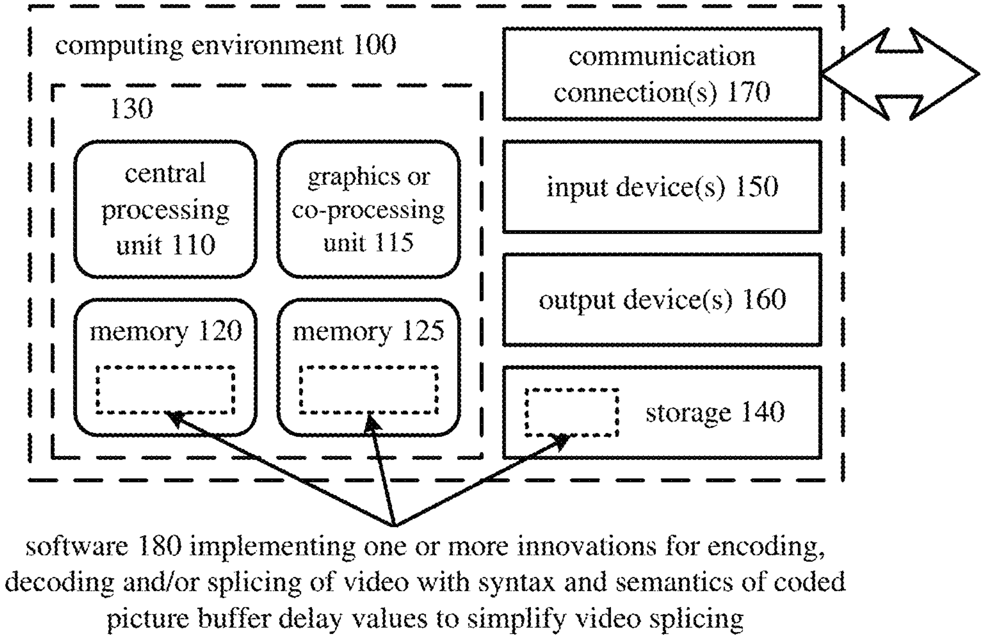
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for encoding, decoding and/or splicing of video with syntax and semantics for CPBRD values that simplifies video splicing, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for encoding, decoding and/or splicing of video with syntax and semantics for CPBRD values that simplifies video splicing.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an application specific integrated circuit ("ASIC") such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments

Figure 2A:
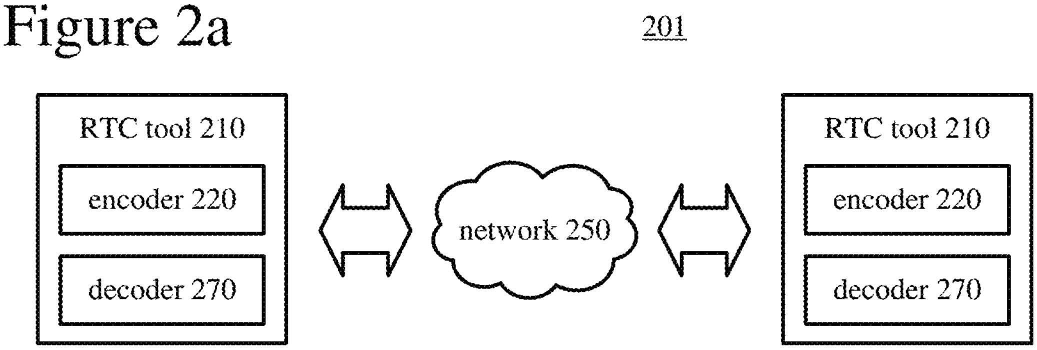
FIGS. 2*a* and 2*b* are diagrams of example network environments in which some described embodiments can be implemented.
Figure 2B:
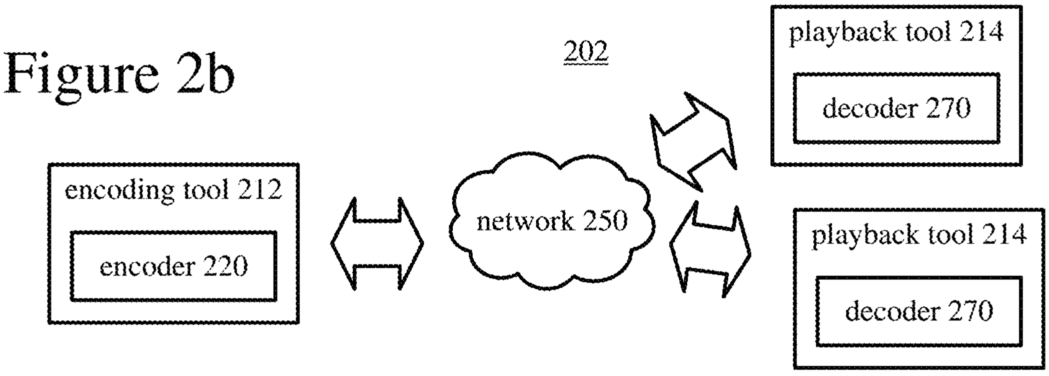

FIGS. 2*a* and 2*b* show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2*a*, each real-time communication ("RTC") tool (210) includes both an encoder (220) and a decoder (270) for bidirectional communication. A given encoder (220) can produce output compliant with the SMPTE 421M standard, ISO/IEC 14496-10 standard (also known as H.264 or AVC), HEVC standard (also known as H.265), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2*a* includes two real-time communication tools (210), the network environment (201) can instead include three or more real-time communication tools (210) that participate in multi-party communication.

Figure 3:
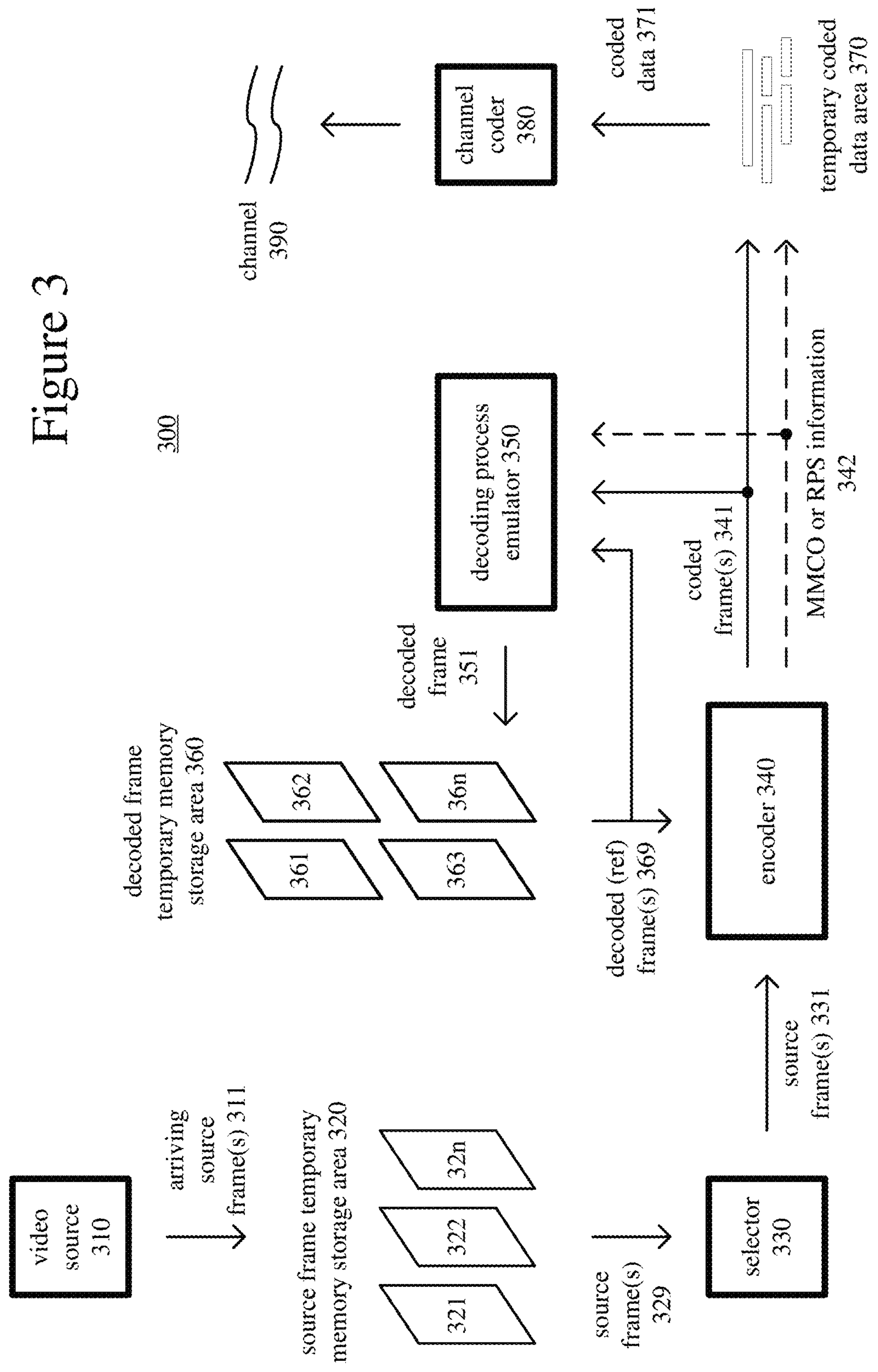
FIG. 3 is a diagram of an example encoder system in conjunction with which some described embodiments can be implemented.
Figure 4:
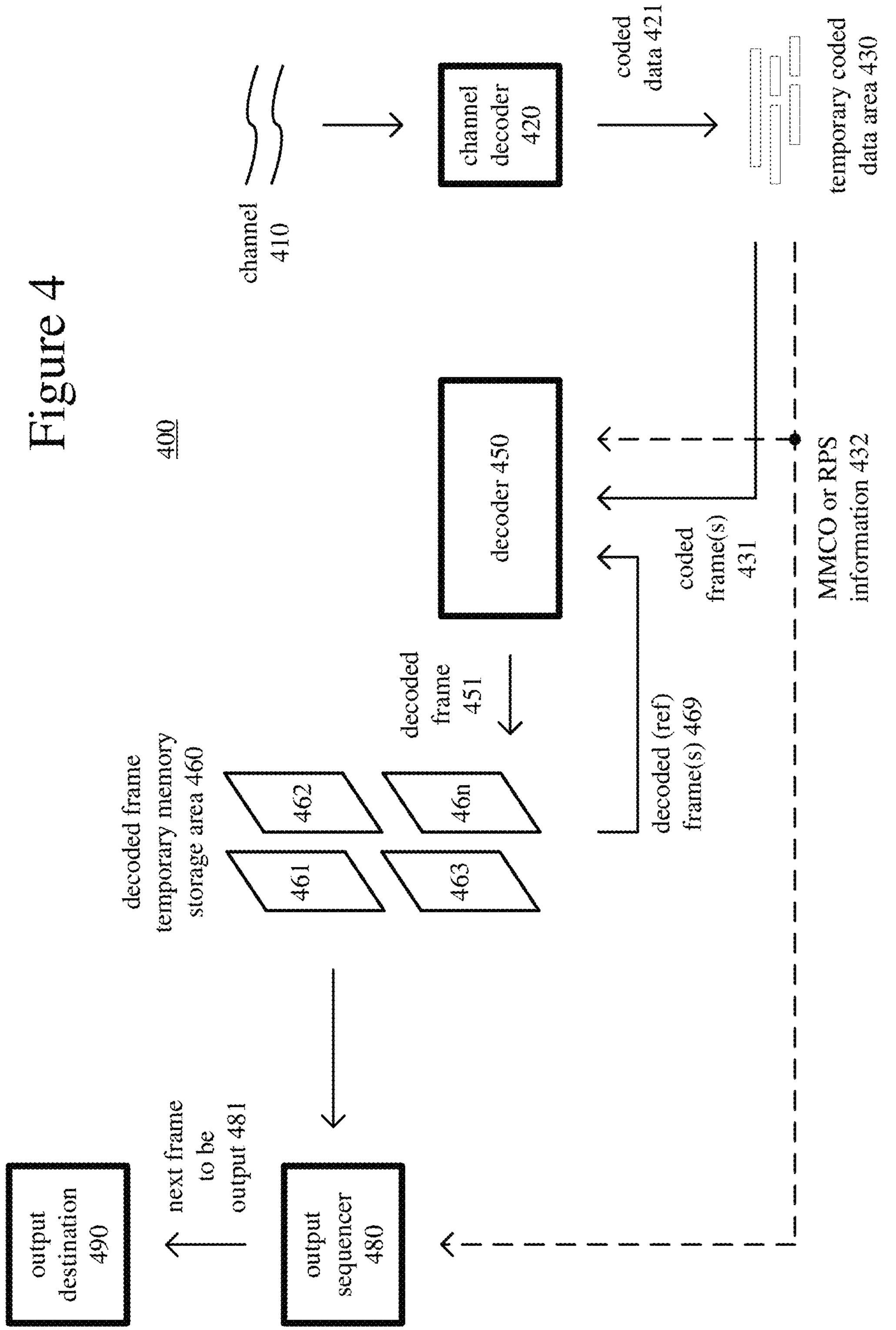
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2*b*, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2*b* includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

The network environment (201) shown in FIG. 2*a* can include multiple RTC tools with multiple encoders. The network environment (202) shown in FIG. 2*b* can include multiple encoding tools with multiple encoders. Such encoders can produce multiple output bitstreams that are spliced by a splicing tool into a single bitstream. Or a single encoder can produce multiple bitstreams that are spliced by a splicing tool into a single bitstream.

III. Example Encoder Systems

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include syntax elements that indicate CPBRD values for pictures as well as syntax elements that indicate how the CPBRD values should be interpreted.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame is de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32*n*). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can also include color space conversion into primary (e.g., luma) and secondary (e.g., chroma differences toward red and toward blue) components and resampling processing (e.g., to reduce the spatial resolution of chroma components) for encoding.

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format (H.265) or other format.

For example, within the encoder (340), an inter-frame coded, predicted frame is represented in terms of prediction from reference frames. A motion estimator estimates the motion of sets of samples of a source frame (331) with respect to one or more reference frames (369). A set of samples can be a macroblock, sub-macroblock or sub-macroblock partition (as in the H.264 standard), or it can be a coding tree unit or prediction unit (as in the HEVC standard). Generally, as used herein, the term "block" indicates a set of samples, which may be a single two-dimensional ("2D") array or multiple 2D arrays (e.g., one array for a luma component and two arrays for chroma components). When multiple reference frames are used, the multiple reference frames can be from different temporal directions or the same temporal direction. The motion estimator outputs motion information such as motion vector information, which is entropy coded. A motion compensator applies motion vectors to reference frames to determine motion-compensated prediction values for inter-frame prediction. The encoder determines the differences (if any) between a block's motion-compensated prediction values and corresponding original values. These prediction residual values are further encoded using a frequency transform, quantization and entropy encoding. For example, the encoder (340) sets values for luma quantization parameter ("QP") and chroma QP for a picture, slice and/or other portion of video, and quantizes transform coefficients accordingly. Similarly, for intra-frame prediction, the encoder (340) can determine intra prediction values for a block, determine prediction residual values, and encode the prediction residual values (with a frequency transform, quantization and entropy encoding). In particular, the entropy coder of the encoder (340) compresses quantized transform coefficient values as well as certain side information (e.g., motion vector information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames that are used by the encoder (340) in motion estimation and compensation. In a manner consistent with the MMCO/RPS information (342), the decoding process emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36*n*). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The encoder (340) sets CPBRD values for pictures that are encoded according to a specification of a buffer flow model (e.g., hypothetical reference decoder ("HRD") or video buffer verifier ("VBV")). In this way, the encoder (340) applies constraints on fluctuations in bit rate for the bitstream, so as to help ensure that the bitstream can be decoded within the buffering resources of a decoding system. The encoder (340) also sets the CPBRD values to help a decoder to determine the timing and steps for operation of its decoding process.

The coded frames (341) and MMCO/RPS information (342) (or information equivalent to the MMCO/RPS information) are also buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages). Such media metadata can include syntax elements that indicate CPBRD values for pictures as well as syntax elements that indicate how the CPBRD values should be interpreted (e.g., as part of PT SEI messages and BP SEI messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0| ISO/IEC 13818-1 or an Internet real-time transport protocol format such as IETF RFC 3550), in which case the channel encoder (380) can add syntax elements as part of the syntax of the media transmission stream. Such syntax can include syntax elements that indicate CPBRD values for pictures as well as syntax elements that indicate how the CPBRD values should be interpreted. Or, the channel encoder (380) can organize the aggregated data for storage as a file (e.g., according to a media container format such as ISO/IEC 14496-12), in which case the channel encoder (380) can add syntax elements as part of the syntax of the media storage file. Such syntax can include syntax elements that indicate CPBRD values for pictures as well as syntax elements that indicate how the CPBRD values should be interpreted. Or, more generally, the channel encoder (380) can implement one or more media system multiplexing protocols or transport protocols, in which case the channel encoder (380) can add syntax elements as part of the syntax of the protocol(s). Again, such syntax can include syntax elements that indicate CPBRD values for pictures as well as syntax elements that indicate how the CPBRD values should be interpreted. The channel encoder (380) provides output to a channel (390), which represents storage, a communications connection, or another channel for the output. The channel encoder (380) or channel (390) may also include other elements (not shown), such as forward-error correction ("FEC") encoding and analog signal modulation.

IV. Example Decoder Systems

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include syntax elements that indicate CPBRD values for pictures as well as syntax elements that indicate how the CPBRD values should be interpreted.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0| ISO/IEC 13818-1 or an internet real-time transport protocol format such as IETF RFC 3550), in which case the channel decoder (420) can parse syntax elements added as part of the syntax of the media transmission stream. Such syntax can include syntax elements that indicate CPBRD values for pictures as well as syntax elements that indicate how the CPBRD values should be interpreted. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Such syntax can include syntax elements that indicate CPBRD values for pictures as well as syntax elements that indicate how the CPBRD values should be interpreted. Or, more generally, the channel decoder (420) can implement one or more media system demultiplexing protocols or transport protocols, in which case the channel decoder (420) can parse syntax elements added as part of the syntax of the protocol(s). Again, such syntax can include syntax elements that indicate CPBRD values for pictures as well as syntax elements that indicate how the CPBRD values should be interpreted. The channel (410) or channel decoder (420) may also include other elements (not shown), such as FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages). Such media metadata can include syntax elements that indicate CPBRD values for pictures as well as syntax elements that indicate how the CPBRD values should be interpreted (e.g., as part of PT SEI messages and BP SEI messages).

The decoder (450) uses the CPBRD values to determine the timing and steps for operation of its overall decoding process. In general, the coded data area (430) temporarily stores coded data (421) until such coded data (421) is used by the decoder (450), as indicated by a CPBRD value. At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, and inverse frequency transforms. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time as nominally indicated by a CPBRD value, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated predictions of blocks (e.g., macroblocks, sub-macroblocks, sub-macroblock partitions, coding tree units, prediction units, or parts thereof, such as coding tree blocks, prediction blocks or other blocks) of the frame being reconstructed. An intra-frame prediction module can spatially predict sample values of a current block from neighboring, previously reconstructed sample values. The decoder (450) also reconstructs prediction residual values. An inverse quantizer inverse quantizes entropy-decoded data. For example, the decoder (450) sets values for luma QP and chroma QP for a picture, slice and/or other portion of video based on syntax elements in the bitstream, and inverse quantizes transform coefficients accordingly. An inverse frequency transformer converts the quantized, frequency domain data into spatial-domain information. For an inter-frame predicted frame, the decoder (450) combines reconstructed prediction residual values with motion-compensated predictions to form a reconstructed frame. The decoder (450) can similarly combine prediction residual values with spatial predictions from intra-frame prediction. An adaptive deblocking filter is included within the motion compensation loop in the video decoder (450) to smooth discontinuities across block boundary rows and/or columns in the decoded frame (451). Other filtering (such as de-ringing filtering, adaptive loop filtering ("ALF"), or sample-adaptive offset ("SAO") filtering; not shown) can alternatively or additionally be applied as in-loop filtering operations.

The decoded frame temporary memory storage area (460) includes multiple frame buffer storage areas (461, 462, . . . , **46*n*). The decoded frame storage area (460) is an example of a DPB. The decoder (450) uses the MMCO/RPS information (432) to identify a frame buffer (461, 462, etc.) in which it can store a decoded frame (451). The decoder (450) stores the decoded frame (451**) in that frame buffer.

An output sequencer (480) identifies (e.g., using information in BP and PT SEI messages) when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders

Figure 5:
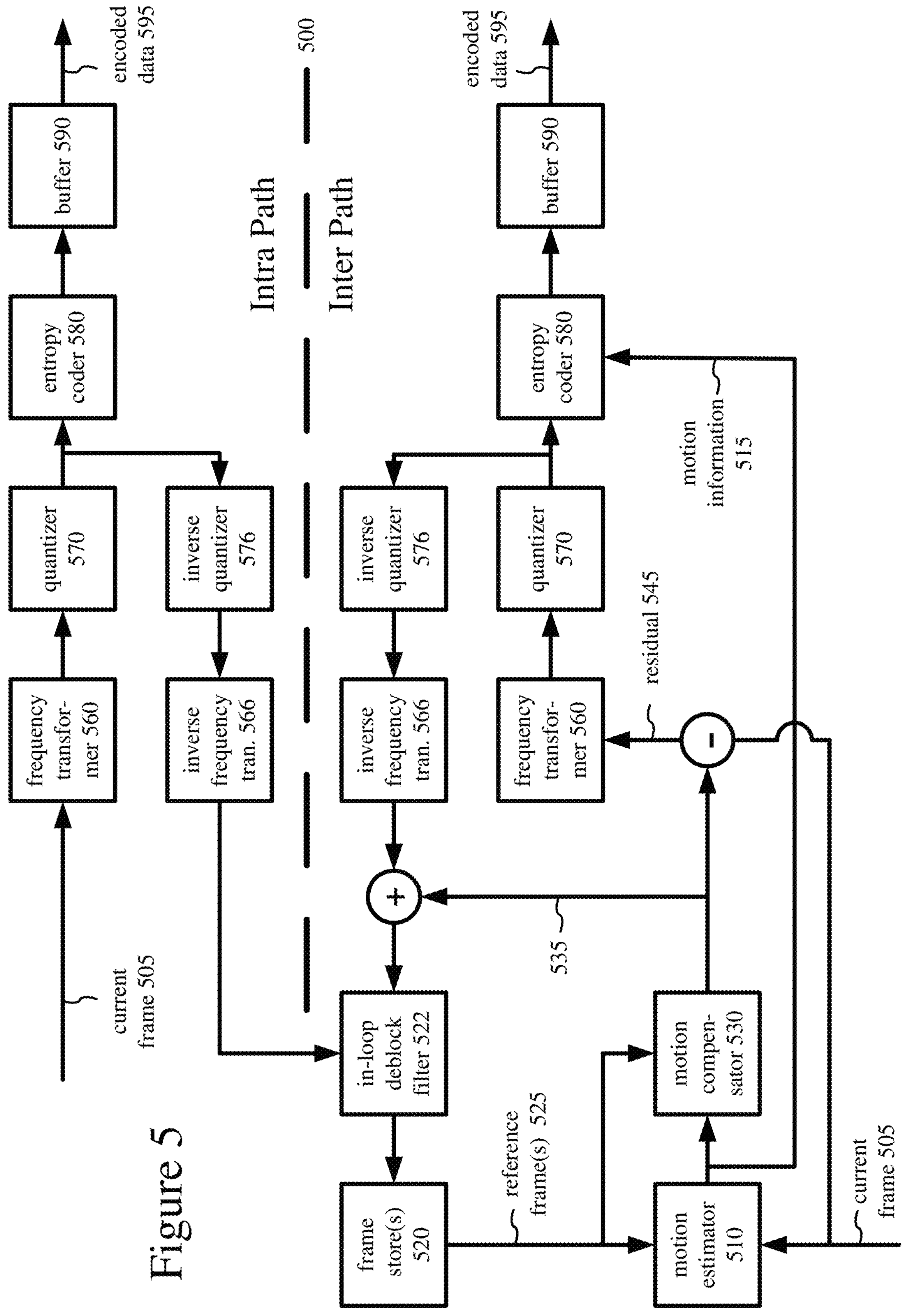
FIG. 5 is a diagram illustrating an example video encoder in conjunction with which some described embodiments can be implemented.

FIG. 5 is a block diagram of a generalized video encoder (500) in conjunction with which some described embodiments may be implemented. The encoder (500) receives a sequence of video frames including a current frame (505) and produces encoded data (595) as output.

The encoder (500) is block-based and uses a block format that depends on implementation. Blocks may be further sub-divided at different stages, e.g., at the frequency transform and entropy encoding stages. For example, a frame can be divided into 64×64 blocks, 32×32 blocks or 16×16 blocks, which can in turn be divided into smaller blocks of sample values for coding and decoding.

The encoder system (500) compresses inter-frame predicted frames and intra-frame coded frames. For the sake of presentation, FIG. 5 shows an "intra path" through the encoder (500) for intra-frame coding and an "inter path" for inter-frame coding. Many of the components of the encoder (500) are used for both intra-frame coding and inter-frame coding. The exact operations performed by those components can vary depending on the type of information being compressed.

If the current frame (505) is an inter-frame predicted frame, a motion estimator (510) estimates the motion of blocks (e.g., macroblocks, sub-macroblocks, sub-macroblock partitions, coding tree units, prediction units, or parts thereof, such as coding tree blocks, prediction blocks or other blocks) of the current frame (505) with respect to one or more reference frames. The frame store (520) buffers one or more reconstructed previous frames (525) for use as reference frames. When multiple reference frames are used, the multiple reference frames can be from different temporal directions or the same temporal direction. The motion estimator (510) outputs as side information motion information (515) such as differential motion vector information.

The motion compensator (530) applies reconstructed motion vectors to the reconstructed reference frame(s) (525) when forming a motion-compensated current frame (535). The difference (if any) between a block of the motion-compensated current frame (535) and a corresponding part of the original current frame (505) is the prediction residual (545) for the block. During later reconstruction of the current frame, reconstructed prediction residual values are added to the motion-compensated current frame (535) to obtain a reconstructed frame that is closer to the original current frame (505). In lossy compression, however, some information is still lost from the original current frame (505). The intra path can include an intra prediction module (not shown) that spatially predicts sample values of a current block from neighboring, previously reconstructed sample values.

A frequency transformer (560) converts spatial-domain video information into frequency domain (i.e., spectral, transform) data. For block-based video frames, the frequency transformer (560) applies a discrete cosine transform, an integer approximation thereof, or another type of forward block transform (e.g., a discrete sine transform or an integer approximation thereof) to blocks of sample value data or prediction residual data, producing blocks of frequency transform coefficients. A quantizer (570) then quantizes the transform coefficients. For example, the quantizer (570) applies dead-zone scalar quantization to the frequency domain data with a quantization step size that varies on a frame-by-frame basis, slice-by-slice basis, block-by-block basis, frequency-specific basis, or other basis. For example, the encoder (500) sets values for luma QP and chroma QP for a picture, slice and/or other portion of video such as a coding unit, and quantizes transform coefficients accordingly.

When a reconstructed version of the current frame is needed for subsequent motion estimation/compensation, an inverse quantizer (576) performs inverse quantization on the quantized frequency coefficient data. An inverse frequency transformer (566) performs an inverse frequency transform, producing blocks of reconstructed prediction residual values or sample values. For an inter-frame predicted frame, the encoder (500) combines reconstructed prediction residual values (545) with motion-compensated predictions (535) to form the reconstructed frame (505). (Although not shown in FIG. 5, in the intra path, the encoder (500) can combine prediction residual values with spatial predictions from intra prediction.) The frame store (520) buffers the reconstructed current frame for use in subsequent motion-compensated prediction.

In FIG. 5, a motion compensation loop in the encoder (500) includes an adaptive in-loop deblock filter (510) (typically) before the frame store (520). The decoder (500) applies in-loop filtering to reconstructed frames to adaptively smooth discontinuities across boundaries in the frames. Other filtering (such as de-ringing filtering, ALF, or SAO filtering; not shown) can alternatively or additionally be applied as in-loop filtering operations.

The entropy coder (580) compresses the output of the quantizer (570) as well as motion information (515) and certain side information (e.g., QP values). The entropy coder (580) provides encoded data (595) to the buffer (590), which multiplexes the encoded data into an output bitstream.

A controller (not shown) receives inputs from various modules of the encoder. The controller evaluates intermediate results during encoding, for example, setting QP values and performing rate-distortion analysis. The controller works with other modules to set and change coding parameters during encoding. The controller can set CPBRD values for pictures that are encoded according to a buffer flow model. In this way, the controller can apply constraints on fluctuations in bit rate for the bitstream, so as to help ensure that the bitstream can be decoded within the buffering resources of a decoding system. The controller also sets the CPBRD values to help a decoder to determine the timing and steps for operation of its decoding process.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders

Figure 6:
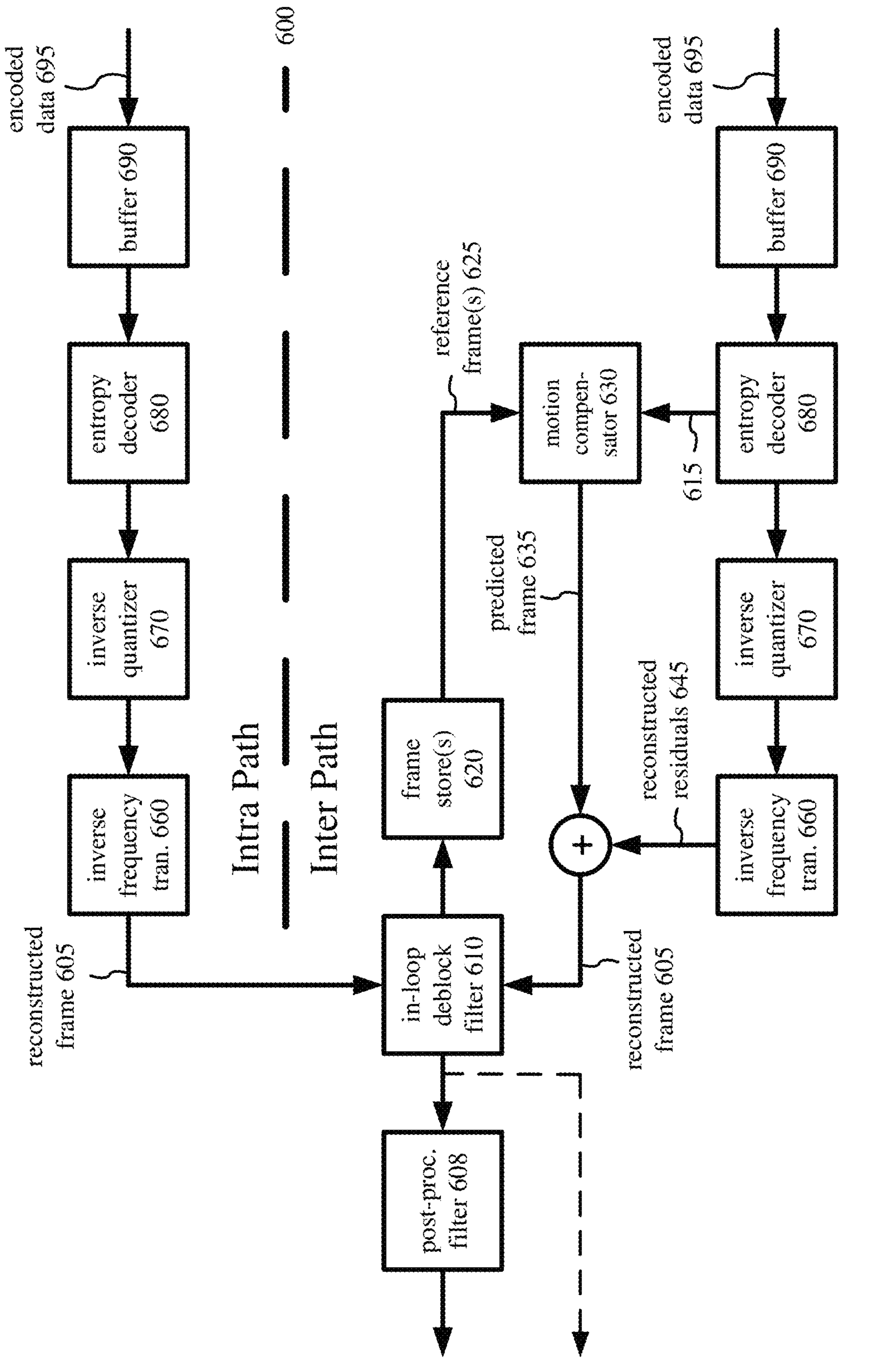
FIG. 6 is a diagram illustrating an example video decoder in conjunction with which some described embodiments can be implemented.

FIG. 6 is a block diagram of a generalized decoder (600) in conjunction with which several described embodiments may be implemented. The decoder (600) receives encoded data (695) for a compressed frame or sequence of frames and produces output including a reconstructed frame (605). For the sake of presentation, FIG. 6 shows an “intra path” through the decoder (600) for intra-frame decoding and an “inter path” for inter-frame decoding. Many of the components of the decoder (600) are used for both intra-frame decoding and inter-frame decoding. The exact operations performed by those components can vary depending on the type of information being decompressed.

A buffer (690) receives encoded data (695) for a compressed frame and makes the received encoded data available to the parser/entropy decoder (680), with timing indicated at least in part by CPBRD values for the respective frames. The parser/entropy decoder (680) entropy decodes entropy-coded quantized data as well as entropy-coded side information, typically applying the inverse of entropy encoding performed in the encoder.

A motion compensator (630) applies motion information (615) to one or more reference frames (625) to form motion-compensated predictions (635) of blocks (e.g., macroblocks, sub-macroblocks, sub-macroblock partitions, coding tree units, prediction units, or parts thereof, such as coding tree blocks, prediction blocks or other blocks) of the frame (605) being reconstructed. The frame store (620) stores one or more previously reconstructed frames for use as reference frames.

The intra path can include an intra prediction module (not shown) that spatially predicts sample values of a current block from neighboring, previously reconstructed sample values. In the inter path, the decoder (600) reconstructs prediction residual values. An inverse quantizer (670) inverse quantizes entropy-decoded data. For example, the decoder (600) sets values for luma QP and chroma QP for a picture, slice and/or other portion of video such as a coding unit, based on syntax elements in the bitstream, and the inverse quantizer (670) inverse quantizes transform coefficients accordingly.

An inverse frequency transformer (660) converts the reconstructed frequency domain data into spatial-domain information. For example, the inverse frequency transformer (660) applies an inverse block transform to frequency transform coefficients, producing sample value data or prediction residual data. The inverse frequency transform can be an inverse discrete cosine transform, an integer approximation thereof, or another type of inverse frequency transform (e.g., an inverse discrete sine transform or an integer approximation thereof).

For an inter-frame predicted frame, the decoder (600) combines reconstructed prediction residual values (645) with motion-compensated predictions (635) to form the reconstructed frame (605). (Although not shown in FIG. 6, in the intra path, the decoder (600) can combine prediction residual values with spatial predictions from intra-frame prediction.) A motion compensation loop in the decoder (600) includes an adaptive in-loop deblock filter (610) before or after the frame store (620). The decoder (600) applies in-loop filtering to reconstructed frames to adaptively smooth discontinuities across boundaries in the frames. Other filtering (such as de-ringing filtering, ALF, or SAO filtering; not shown) can alternatively or additionally be applied as in-loop filtering operations.

In FIG. 6, the decoder (600) also includes a post-processing filter (608). The post-processing filter (608) can include de-ringing filtering, adaptive Wiener filtering, film-grain reproduction filtering, SAO filtering or another kind of filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Syntax and Semantics for CPBRD Values to Simplify Splicing

This section presents various innovations for syntax and semantics of coded picture buffer removal delay (“CPBRD”) values. In many cases, the innovations simplify splicing of video sequences. Various examples are provided for CPBRD values as signaled in supplemental enhancement information (“SEI”) messages according to the HEVC standard and the H.264/AVC standard.

A. Introduction

In draft versions of the HEVC standard such as JCTVC-K1003, and in the H.264/AVC standard, syntax and semantics are specified for a picture timing SEI (“PT SEI”) message. A PT SEI message includes a syntax element indicating coded picture buffer removal delay (“CPBRD”). In JCTVC-K1003, the syntax element is named au_cpb_removal_delay_minus1, and it is interpreted by adding 1 to the coded integer value that is signaled in a PT SEI message.

In general, together with the initial buffering delay (or, alternatively, an initial buffer fullness), the CPBRD value for a given picture (typically called the “current picture”) specifies the nominal time at which the coded data associated with the picture is to be removed from the coded picture buffer (“CPB”). The CPB is a hypothetical decoder buffer, and the decoder can use it as reference to design the decoder buffer. Also, an encoder can generate compliant bitstreams based on the hypothetical decoder buffer. In the context of the HEVC standard, the set of data associated with the current picture is an “access unit.” The CPBRD value is understood in the context of a buffer model, which may be called an HRD or VBV. Specification according to the buffer model helps to ensure that bitstreams can be decoded within the buffering resources of a decoding system, and helps the decoder to determine the timing and steps for operation of its overall decoding process for pictures.

The timing reference for CPBRD values is reset for subsequent messages when a buffering period SEI (“BP SEI”) message is present in the coded video data. In JCTVC-K1003, a CPBRD value is always encoded relative to the nominal removal time of the preceding picture (if any) in decoding order that contained a BP SEI message. An encoder might send a BP SEI message along with every random access point ("RAP") picture in the bitstream. An encoder may also send BP SEI messages with other pictures that are not RAP pictures.

A video splicing tool commonly performs splicing operations at the locations of RAP pictures in bitstreams. A RAP picture may be an instantaneous decoder refresh ("IDR") picture. The RAP picture has a BP SEI message associated with it. For example, a splicing operation may be used to insert a commercial or series of commercials into a television program, or to switch between different television programs.

The design for HEVC RAP pictures is specifically intended to enable the use of RAP pictures as splicing points for bitstreams. In JCTVC-K1003, however, the CPBRD value is always coded relative to the nominal CPB removal time of the preceding picture in decoding order that has a BP SEI message. Because of this reference point, it can be difficult for a splicing system to determine the correct value for the CPBRD value when splicing between bitstreams (or smoothly concatenating separately-encoded bitstreams to form a longer bitstream).

Thus, for approaches for CPBRD syntax and semantics as in JCTVC-K1003, in order to perform a splicing operation to switch from sending pictures of a bitstream A to sending pictures of a bitstream B, a splicing tool adjusts the CPBRD value of the picture at a splice point (i.e., the CPBRD value in a PT SEI message associated with the picture at the splice point). The splice point, where the switch happens, is a location corresponding to a RAP picture in bitstream B. (The RAP picture in bitstream B at the splice point also has a BP SEI message with it, and the BP SEI message will reset the reference time for CPBRD values of the subsequent pictures from bitstream B in decoding order, so adjustment of CPBRD values for subsequent pictures in bitstream B is unnecessary.) To accomplish the splicing operation, the splicing tool typically performs the following steps, although not necessarily in this order, and some alternative variations may exist.

The splicing tool finds and reads the CPBRD value of the RAP picture in bitstream B, relative to the nominal removal time of the picture with the previous BP SEI message in bitstream B. The value of this CPBRD is DRAPB. If there was no preceding picture in bitstream B, DRAPB may be set to a value based on the local frame rate (e.g., based on DeltaToDivisor, which may be specified based on the value of pic_struct_present_flag, field_pic_flag, and pic_struct for the last picture in bitstream A or first picture in bitstream B).

The splicing tool also finds and reads the CPBRD value of the picture (of bitstream B) that preceded the RAP picture in decoding order in bitstream B, which is a delay relative to the picture with the previous BP SEI message in bitstream B. The value of this CPBRD is DPREVB. If there was no preceding picture in bitstream B, DPREVB is set to 0.

The splicing tool also finds and reads the CPBRD value of the last picture (of bitstream A) that precedes the splice point in decoding order in bitstream A, which is a delay relative to the picture with the previous BP SEI message in bitstream A. The value of this CPBRD is DPREVA. If the last picture (of bitstream A) that precedes the splice point in decoding order in bitstream A is a picture with a BP SEI message, DPREVA is set to 0.

The splicing tool then modifies the CPBRD value of the RAP picture from bitstream B at the splice point, setting that CPBRD value equal to DPREVA+ (DRAPB-DPREVB), so that the CPBRD value of the RAP picture from bitstream B at the splice point is expressed relative to the picture with the previous BP SEI message in bitstream A. The splicing tool puts this modified RAP picture and the subsequent pictures from bitstream B into the spliced bitstream after the pictures that were obtained from bitstream A.

Certain details, associated other operations, and potential complications have been omitted from this description. For example, the description does not address cases when the reference clock tick value is different between the two bitstreams or when RAP pictures and BP SEI message locations do not coincide.

The splicing tool performs the finding and reading operations described above because, according to previous approaches for CPBRD syntax and semantics, CPBRD information is referenced to the picture in the bitstream with the previous BP SEI message. The splicing tool adjusts the CPBRD information in the spliced bitstream so that the CPBRD value at the splice point is expressed relative to this reference point. The operations of finding and reading CPBRD values can be burdensome and difficult to perform, and may require access to data that is not readily accessible to the splicing system (e.g., due to encryption or buffering capacity constraints).

Figure 7:
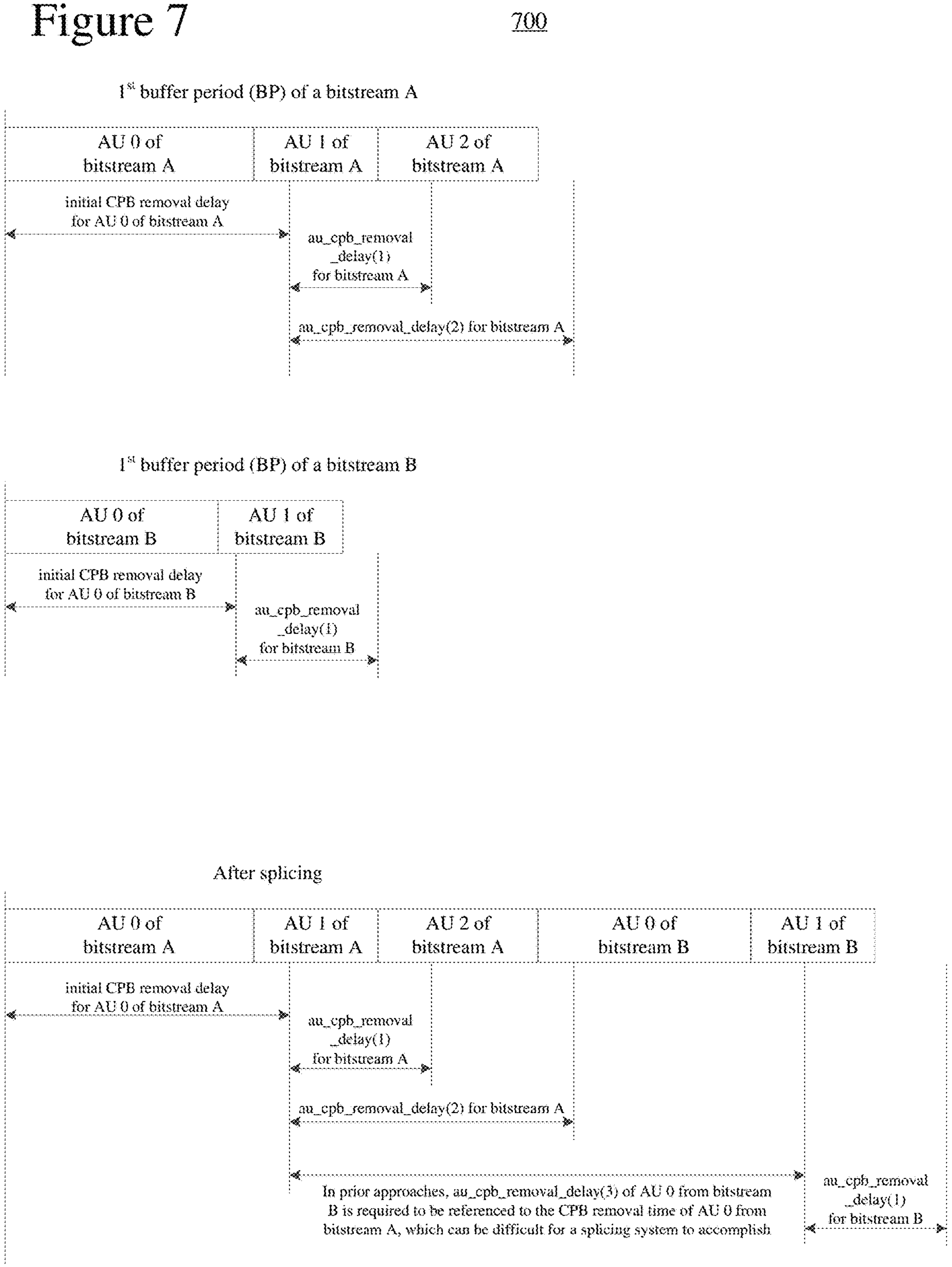
FIG. 7 is a diagram illustrating splicing operations according to prior approaches to adjusting CPBRD values.

FIG. 7 illustrates the problem for a simplified situation involving the concatenation of two separately-encoded bitstreams A and B. The top part of FIG. 7 shows three access units ("AUs") of a bitstream A and two AUs of a bitstream B, before splicing. For bitstream A, CPBRD values are signaled to indicate removal delays for the 2$^{nd}$ and 3$^{rd}$ AUs (that is, AU 1 and AU 2) relative to the initial CPB removal delay for the 1$^{st}$ AU (that is, AU 0) of bitstream A. For bitstream B, a CPBRD value is signaled to indicate removal delay for the 2$^{nd}$ AU (that is, AU 1) relative to the initial CPB removal delay for the 1$^{st}$ AU (that is, AU 0) of bitstream B. The value au_cbp_removal_delay (k) refers to the CPB removal delay of AU number k. When the AUs of bitstream B are spliced after the AUs of bitstream A, a CPBRD is determined for the 1$^{st}$ AU (AU 0) of bitstream B. The bottom part of FIG. 7 shows the AUs of bitstreams A and B after splicing into a single bitstream. Some of the CPBRD values of AUs are unchanged in the spliced bitstream (i.e., the CPBRD values for the 2$^{nd}$ and 3$^{rd}$ AUs (AU 1 and AU 2) of bitstream A relative to the initial CPB removal delay for the 1$^{st}$ AU (AU 0) of bitstream A, and the CPBRD value for the 2$^{nd}$ AU (AU 1) of bitstream B relative to the CPB removal delay for the 1$^{st}$ AU (AU 0) of bitstream B). The CPBRD value for the 1$^{st}$ AU (AU 0 before splicing; numbered AU 3 after splicing) of bitstream B is adjusted, however, to express a removal delay relative to the initial CPB removal delay for the 1$^{st}$ AU (AU 0) of bitstream A, for the spliced bitstream. In more complicated examples (e.g., when the bitstreams include more AUs and/or when some AUs are not available), determining the CPBRD value for the 1$^{st}$ AU of the second sequence in the spliced bitstream could be difficult.

B. General Approach to Modifying Syntax and Semantics of CPBRD

This section describes various modifications to previous approaches to syntax and semantics of CPBRD. According to the modifications, when a given picture (typically called the "current picture") has a BP SEI message associated with it, an encoder can send syntax elements indicating the following:

(a) a CPBRD value relative to the nominal CPB removal time of the picture that precedes the current picture in decoding order (also called bitstream order or decoded order) that has a BP SEI message, as in the previous approaches ("item a");

(b) a CPBRD value relative to the nominal CPB removal time of the last picture that precedes the current picture in decoding order, regardless of whether that last preceding picture has a BP SEI message or not ("item b") (in some variations, the last picture that precedes the current picture in the same or lower temporal sub-layer is considered; for example, if the current picture has TemporalId equal to 0, the preceding picture also has TemporalId equal to 0); and (c) indications of (i) whether the value specified in item a is present (or if always present, whether its value is valid), and (ii) whether the value specified in item b is present (or if always present, whether its value is valid) ("item c").

The two indications for item c can be combined into a single syntax element indicating one of the three allowed combinations (that is, item a valid/item b not valid, item a not valid/item b valid, or items a and b both valid). (Alternatively, in implementations in which the value of 0 cannot be a valid value, for item c, one way to indicate a lack of validity would be to use the value of 0 for the CPBRD value. Indicating that neither of the CPBRD values is valid would be prohibited.)

Using such syntax, a splicing tool can simplify its splicing operations in many cases. If the content of bitstream B follows the convention in item b, the reading of other values is not necessary—the data from the two bitstreams can simply be concatenated together. If the content of bitstream B also contains syntax elements that follow the convention in item a, the item a CPBRD data would be removed or marked as invalid in the concatenated bitstream.

When the current picture does not have a BP SEI message, the syntax of the HEVC standard as in JCTVC-K1003, or an equivalent syntax (as in the H.264/AVC standard), can be used without alteration.

As a variation of item b, the syntax can specify a CPBRD increment value relative to the nominal CPB removal time of the last picture that precedes the current picture in decoding order within the same temporal sub-layer or a lower temporal sub-layer (instead of in any temporal sub-layer, as implied above). In this case, the CPBRD value is expressed relative to the preceding picture in the same (or lower) temporal sub-layer rather than just the preceding picture of any sub-layer, which makes the scheme robust to the removal of pictures of higher temporal sub-layers, if any. This variation can also be applied for the single-value approach and two-value approaches described in sections C, D and E, respectively. For example, if the current picture has TemporalId equal to 0, the CPBRD value is expressed relative to the preceding picture with TemporalId equal to 0. This might be the situation when CPBRD values following the convention of item B are only signaled for pictures that have TemporalId equal to 0 (e.g., due to a condition that SEI messages with such CPBRD values can be used only for pictures having TemporalId equal to 0).

C. Single-Value Approach Using Flag

In single-value variations of the modifications described above, for some pictures, the encoder sends one of the two CPBRD values for item a and item b, along with an indication of whether the signaled CPBRD value corresponds to the convention of item a or item b.

FIGS. 8 and 9 illustrate an implementation of the single-value approach in which the syntax and semantics of BP SEI messages (as in JCTVC-K1003) are modified, and in which the semantics of some PT SEI messages (as in JCTVC-K1003) are modified although their syntax is unchanged. The BP SEI message syntax is modified to include a flag termed concatenation_flag, as shown in the example syntax (800) of FIG. 8. A concatenation_flag is a binary value. When a given picture (current picture) has a BP SEI message, the semantics of the CPBRD value in the PT SEI message for the current picture depend on the value of the concatenation_flag in the BP SEI message for the picture. FIG. 9 shows syntax (900) for a PT SEI message, including a syntax element au_cpb_removal_delay_minus1. When the value of the concatenation_flag is 0, the CPBRD value indicated by the syntax element au_cpb_removal_delay_minus1 is interpreted according to the convention of item a. On the other hand, when the value of the concatenation_flag is 1, the CPBRD value indicated by au_cpb_removal_delay_minus1 is interpreted according to the convention of item b.

Other syntax elements shown in FIGS. 8 and 9 have meanings specified in JCTVC-K1003.

For a spliced bitstream, when the concatenation_flag is 1, the nominal removal time $t_{r,n}(n)$ for a picture n that has a BP SEI message can be computed from the nominal removal time $t_{r,n}(n-1)$ of the previous picture (access unit) n−1, together with a delay:

$$t_{r,n}(n)=t_{r,n}(n-1)+t_c*(\mathrm{Max}(\mathrm{au\_cpb\_removal\_delay}(n),\ \mathrm{Ceil}((\mathrm{InitCpbRemovalDelay}[\mathrm{SchedSelIdx}]=90000+t_{af}(n-1)-t_{r,n}(n-1))\div t_c))).$$

In this formula, the constraint $\mathrm{Ceil}((\mathrm{InitCpbRemovalDelay}[\mathrm{SchedSelIdx}]\div 90000+t_{af}(n-1)-t_{r,n}(n-1)\div t_c)$ ensures that delay is at least as long as it would be if decoding started at the splice point (picture n) without buffer underflow. The delay added to $t_{r,n}(n-1)$ is set depending on the longer of the CPBRD value signaled for picture n and the start-up delay indicated by the constraint.

Figure 10:
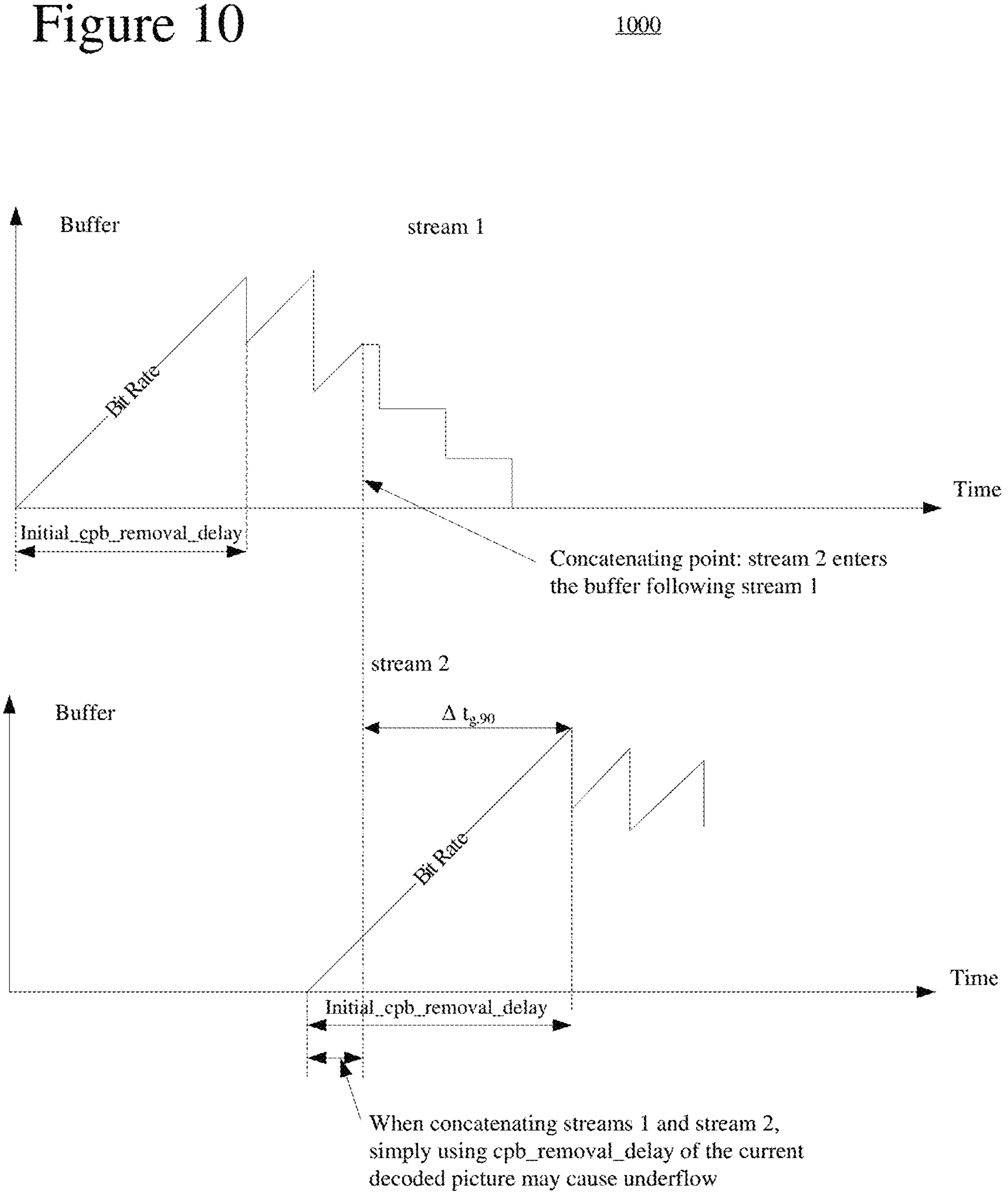
FIG. 10 is a chart illustrating buffer fullness when two bitstreams are spliced.

FIG. 10 shows why the constraint $\mathrm{Ceil}((\mathrm{InitCpbRemovalDelay}[\mathrm{SchedSelIdx}]=90000+t_{af}\ (n-1)-t_{r,n}(n-1))\div t_c)$ is considered. For each access unit n, with n>0, associated with a buffering period SEI message, the value $\Delta t_{g.90}(n)$ is specified by $\Delta t_{g.90}(n)=90000*(t_{r,n}(n)-t_{af}(n-1))$, where $t_{r,n}(n)$ is the nominal removal time of access unit n (in FIG. 10, the first access unit of the current buffer period), and where $t_{af}(n-1)$ is the final arrival time of access unit n−1 (in FIG. 10, the last access unit of the previous buffer period). In FIG. 10, when the stream 1 and stream 2 are concatenated together, underflow might happen if the CPBRD value is used. With the constraint, underflow is avoided because the buffer status of stream 2 after the concatenation remains the same as the original buffer status.

D. Two-Value Approach Using Flag and Delta Value

In some two-value variations of the modifications described above, for some pictures, the encoder could send one or both of the two CPBRD values for item a and item b in SEI messages for a RAP picture.

FIG. 11 illustrates an implementation of the two-value approach in which the syntax and semantics of BP SEI messages (as in JCTVC-K1003) are modified. The syntax of PT SEI messages (as in JCTVC-K1003) is unchanged. As shown in the example syntax (1100) of FIG. 11, the BP SEI message syntax is modified to include a concatenation_flag and a syntax element termed au_cpb_removal_delay_delta_minus1, which can indicate a CPBRD "delta" value (here, the delta value minus one).

The concatenation_flag syntax element indicates whether a specified constraint applies to the relationship between the value of au_cpb_removal_delay_delta_minus1 and the value of au_cpb_removal_delay_minus1 for the preceding picture in decoding order, if any (or, in some variations, the preceding picture in the same or lower temporal sub-layer, if any, for example, by checking for a preceding picture with TemporalId less than or equal to the value of TemporalId of the current picture). For example, when temporal sub-layering is considered, if the current picture has TemporalId equal to 0, the check is for the preceding picture with TemporalId equal to 0.

The au_cpb_removal_delay_delta_minus1 syntax element, plus 1, specifies a CPB removal delay increment value relative to the nominal CPB removal time of the last picture that precedes the current picture in bitstream order (decoding order), if any (or, in some variations, the last such picture in the same or lower temporal sub-layer, if any, for example, by checking for a preceding picture with TemporalId less than or equal to the value of TemporalId of the current picture). For example, when temporal sub-layering is considered, if the current picture has TemporalId equal to 0, the check is for the preceding picture with TemporalId equal to 0.

When concatenation_flag is equal to 0, the CPBRD value (as determined by the au_cpb_removal_delay_minus1 syntax element of the PT SEI message for the current picture) is interpreted according to item a. If the preceding picture does not have a BP SEI message, this item a CPBRD value is equal to the CPBRD value according to item b plus the item a CPBRD value for the picture that precedes the current picture in decoding order (in some variations, the preceding picture of the appropriate temporal sub-layer). The item b CPBRD value is the difference between the item a CPBRD value for the current picture and the item a CPBRD value for the preceding picture. This item b value is indicated by the syntax element au_cpb_removal_delay_delta_minus1, and its value can be checked against the difference between the two item a CPBRD values that are sent in the PT SEI messages of the current and preceding pictures to verify that the item a and item b CPBRD values are valid. The separate item a CPBRD value is signaled in a PT SEI message for the current picture. In other words, when the current picture has a BP SEI message and concatenation_flag is equal to 0, and the current picture is not the first picture in the bitstream, the following is required for bitstream conformance.

(1) If the preceding picture (or, in some variations, preceding picture with TemporalId less than or equal to the value of TemporalId of the current picture) does not have a BP SEI message, the au_cpb_removal_delay_minus1 of the current picture is equal to the au_cpb_removal_delay_minus1 of the preceding picture (in some variations, preceding picture with TemporalId less than or equal to the value of TemporalId of the current picture) plus au_cpb_removal_delay_delta_minus1 plus 1.

(2) Otherwise (the preceding picture has a BP SEI message), au_cpb_removal_delay_minus1 is equal to au_cpb_removal_delay_delta_minus1.

These requirements mean that when concatenation_flag is equal to 0, the indications for item a and item b are both valid and present, assuming the preceding conditions are satisfied and the preceding picture does not have a BP SEI message. In this case, a BP SEI message for the current picture includes an item b CPBRD value (represented with the syntax element au_cpb_removal_delay_delta_minus1), and a PT SEI message for the current picture includes an item a CPBRD value (represented with au_cpb_removal_delay_minus1). On the other hand, when the preceding picture has a BP SEI message (and the flag is still equal to 0), the syntax elements au_cpb_removal_delay_delta_minus1 and au_cpb_removal_delay_minus1 both indicate an item a CPBRD value.

When concatenation_flag is equal to 1, the above-described bitstream conformance requirement need not be fulfilled for the syntax elements au_cpb_removal_delay_delta_minus1 and au_cpb_removal_delay_minus1. When the flag is equal to 1, CPBRD computation is altered to be appropriate for bitstream splicing, rather than being referenced directly to the preceding picture that had a BP SEI message. When the current picture has a BP SEI message and concatenation_flag is equal to 1, the au_cpb_removal_delay_minus1 syntax element for the current picture (in the PT SEI message for the current picture) is ignored. Thus, when concatenation_flag is equal to 1, only the indication for item b is valid, as indicated by the au_cpb_removal_delay_delta_minus1 syntax element (in the BP SEI message for the current picture).

The above-specified interpretation of the CPBRD values would make it possible to splice bitstreams (that use suitably-designed referencing structures) by simply changing the value of concatenation_flag from 0 to 1 in the BP SEI message for the RAP picture at the splicing point.

In this scheme, since the indication for item b is always valid (although it is in some cases required to be equal to the item a CPBRD value of the current picture, and in other cases is required to be equal to the difference between the item a CPBRD values of the current and previous pictures), the specification of the HRD timing information can always be based on item b. Further, when concatenation_flag is equal to 0, the decoder can check whether the equality condition is fulfilled or not. If it is not fulfilled, this would indicate that some problem occurred (e.g., preceding picture has been lost, or preceding picture at the same or lower temporal sub-layer has been lost). Upon detecting that this picture has been lost, the decoder can recover the correct CPBRD timing information by interpreting the item a CPBRD data and discarding the item b data (since computing the proper CPBRD timing from that data requires use of the data of the lost picture). The decoder can also invoke loss concealment measures if such a loss is detected.

In such a two-value approach using a flag (e.g., concatenation_flag) and delta value, the nominal removal time for a picture n that has a BP SEI message can be computed from the nominal removal time of the previous picture (access unit) $n_b$, together with a delay. For example, when access unit n is the first access unit of a buffering period that does not initialize the HRD, the nominal removal time $t_{r,n}(n)$ of the access unit n from the CPB is specified as follows.

If the current picture is associated with a BP SEI message with concatenation_flag equal to 1, the nominal removal time $t_{r,n}(n)$ is specified as:

$$t_{r,n}(n) = t_{r,n}(n_b) + t_c * (\text{Max}((\text{au\_cpb\_removal\_delay\_delta\_minus1}(n) + 1), \text{Ceil}((\mathit{InitCpbRemovalDelay}[\mathit{SchedSelIdx}] \div 90000 + t_{af}(n_b) - t_{r,n}(n_b)) \div t_c))),$$

where $t_{r,n}(n_b)$ is the nominal removal time of the preceding picture (in some variations, the preceding picture with TemporalId less than or equal to the value of TemporalId of the current picture) and au_cpb_removal_delay_delta_minus1 (n) is the value of au_cpb_removal_delay_delta_minus1 in the BP SEI message associated with access unit n. The constraint Ceil((InitCpbRemovalDelay[SchedSelIdx]=90000+$t_{af}(n_b)-t_{r,n}(n_b)$)÷$t_c$) ensures that delay is at least as long as it would be if decoding started at the splice point (picture n) without buffer underflow. The delay added to $t_{r,n}(n_b)$ is set depending on the longer of the CPBRD value signaled for picture n and the start-up delay indicated by the constraint.

Otherwise (the current picture is not associated with a BP SEI message with concatenation_flag equal to 1), the nominal removal time is specified as:

$$t_{r,n}(n) = t_{r,n}(n_b) + t_c * (\text{au\_cpb\_removal\_delay\_minus1}(n) + 1),$$

where $t_{r,n}(n_b)$ is the nominal removal time of the first access unit of the previous buffering period, and au_cpb_removal_delay_minus1 (n) is the value of au_cpb_removal_delay_minus1 in the PT SEI message associated with access unit n.

For the two-value approach with a concatenation flag and delta value, the impact on decoder complexity and the added quantity of syntax data is minimal. The added syntax elements (au_cpb_removal_delay_delta_minus1 and associated concatenation_flag) are only needed for pictures that have BP SEI messages, which are relatively infrequent. Splicing operations are potentially greatly simplified. With this approach, it could become possible to splice between bitstreams or smoothly concatenate separately-encoded bitstreams (that use suitably-designed referencing structures) by simply setting the value of concatenation_flag to 1 in the BP SEI message for the RAP picture at the splicing point. At the same time, when concatenation_flag is equal to 0, the specified constraint would enable the decoder to check whether the constraint is satisfied as a way to detect the loss of the preceding picture (or preceding picture in the same or lower temporal sub-layer).

E. Conditional Use of Alternative CPBRD Syntax and Semantics

In some variations, the use or non-use of alternative CPBRD syntax and semantics is signaled in the bitstream. Thus, if the quantity of added data is a concern, the presence of the additional syntax elements could be conditioned on a flag at a higher syntax level, with the conventional interpretation (CPBRD values relative to preceding picture having a BP SEI message) applied when the additional syntax elements are not present.

For example, an encoder can set an on/off value in a sequence parameter set ("SPS") or elsewhere in the bitstream to indicate whether CPBRD syntax and semantics is used with support for simplified video splicing operations. If the on/off value indicates support for simplified video splicing is off, the encoder uses conventional CPBRD syntax and semantics, as in a previous approach. If the on/off value indicates support for simplified video splicing is on, the encoder uses CPBRD syntax and semantics with support for simplified video splicing operations (e.g., according to one of the new approaches described herein).

A corresponding decoder receives and parses the on/off values in the active SPS or elsewhere in the bitstream to indicate whether CPBRD syntax and semantics is used with support for simplified video splicing operations. If the on/off value indicates support for simplified video splicing is off, the decoder uses conventional CPBRD syntax and semantics, as in a previous approach. If the on/off value indicates support for simplified video splicing is on, the encoder uses CPBRD syntax and semantics with support for simplified video splicing operations (e.g., according to one of the new approaches described herein).

A video splicing tool can consider the on/off flag when deciding how to perform splicing operations. If the on/off value is not set (off), the splicing tool uses conventional splicing with adjustment of CPBRD values, as in a previous approach. If the on/off value is set (on), the splicing tool uses simplified concatenation operations as described herein.

F. Alternatives for Decoding Units

In many of the preceding examples, CPBRD values are set or determined for pictures. Such a picture can also be termed an access unit corresponding to a primary picture.

Alternatively, CPBRD values are set or determined for decoding units, where a decoding unit is a subset of an access unit for a primary picture. For example, a decoding unit can be a slice of a picture. An HRD can operate on access units or on decoding units (e.g., for slices or other parts of pictures). In general, for a decoding unit, a CPBRD value is relative to the last decoding unit of the preceding picture.

The techniques and tools described herein can be applied to access units or decoding units. The term "unit" can mean an access unit or decoding unit. The CPBRD value for a unit is expressed relative to a preceding picture. For an access unit, the preceding access unit can be the last access unit, last access unit in the same temporal sub-layer or a lower temporal sub-layer, or last access unit with a BP SEI message, depending on interpretation. For a decoding unit, the last decoding unit of such a preceding access unit is considered.

G. Techniques for Modifying Syntax and Semantics of CPBRD

Figure 12:
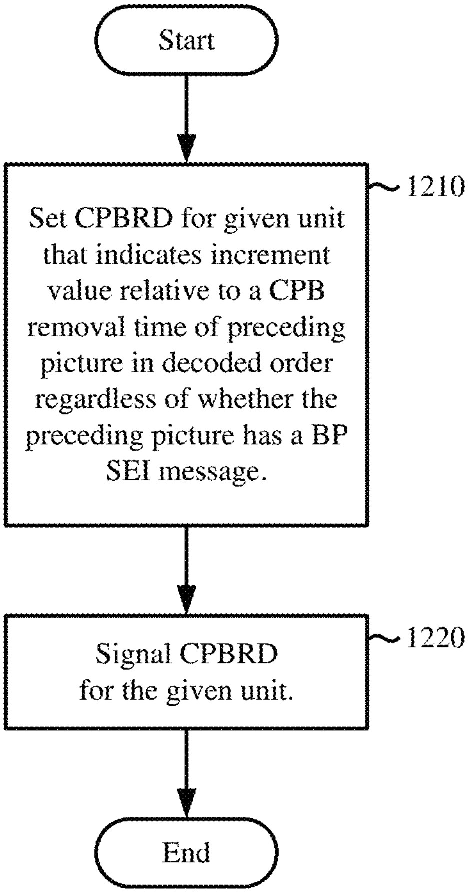
FIG. 12 is a flowchart illustrating a generalized technique for setting CPBRD values during encoding to simplify video splicing.

FIG. 12 shows a generalized technique (1200) for setting CPBRD values during encoding. A video encoder such as one described above with reference to FIG. 3 or other video encoder performs the technique (1200).

The encoder sets (1210) a CPBRD value for a given unit of a video sequence. For example, the given unit is an access unit for a picture that has a BP SEI message and can be a random access picture. Or, the given unit is a decoding unit for part of such a picture. The CPBRD value for the given unit indicates an increment value relative to a nominal CPB removal time of a preceding picture in decoding order regardless of whether the preceding picture has a BP SEI message. In some implementations, the preceding picture immediately precedes the given unit (or picture that includes the given unit) in decoding order. Alternatively, among pictures of the video sequence at the same temporal sub-layer as the given unit or at a lower temporal sub-layer, the preceding picture immediately precedes the given unit (or picture that includes the given unit) in decoding order. For example, when temporal sub-layering is considered, if the current picture has TemporalId equal to 0, the preceding picture is the preceding picture with TemporalId equal to 0.

The encoder signals (1220) the CPBRD value for the given unit. For example, the CPBRD value is written in a BP SEI message or PT SEI message associated with an access unit for a coded picture.

In some variations (e.g., two-value approaches), the encoder potentially sets multiple CPBRD values for the given unit according to different conventions. For example, in addition to the CPBRD value set (1210) as an increment value relative to a nominal CPB removal time of a preceding picture in decoding order regardless of whether the preceding picture has a BP SEI message, the encoder sets another CPBRD value for the given unit. The other CPBRD value for the given unit indicates an increment value relative to a nominal CPB removal time of a preceding picture in decoding order that has a BP SEI message. The encoder then signals the other CPBRD for the given unit (e.g., in a PT SEI message for the given unit). The encoder can also signal (e.g., write in SEI message(s)) one or more indications of whether each of the CPBRD values, respectively, is present or absent. Or, the encoder can signal (e.g., write in SEI message(s)) one or more indications of whether each of the CPBRD values, respectively, is valid or not valid.

In other variations (e.g., single-value approaches), the encoder signals (e.g., writes in SEI message(s)) an indication of type of the CPBRD value for the given unit. For example, the indication of the type of the CPBRD value is signaled in a BP SEI message of the given unit or picture that includes the given unit. The indication of type of the CPBRD value indicates how to interpret the CPBRD value for the given unit, which can be signaled in a PT SEI message. For example, the encoder signals an indication of type of CPBRD value for a given unit of a video sequence, then sets the CPBRD value for the given unit. For a first type of CPBRD value, the CPBRD value for the given unit indicates an increment value relative to a nominal CPB removal time of a preceding picture in decoding order that has a BP SEI message. For a second type of CPBRD value, the CPBRD value for the given unit indicates an increment value relative to a nominal CPB removal time of a preceding picture in decoding order regardless of whether the preceding picture has a BP SEI message. The encoder then signals the CPBRD value for the given unit.

In still other variations (e.g., two-value approaches using a flag and delta value), the encoder signals (e.g., writes in SEI message(s)) an indication of type of the CPBRD value for the given unit and signals a CPBRD value for the given unit to represent the delta value. For example, the indication of the type of the CPBRD value and the CPBRD value (delta value) are signaled in a BP SEI message of the given unit or picture that includes the given unit. Depending on the type of the CPBRD value, the CPBRD value for the current picture may be signaled in a PT SEI message. For example, the encoder signals an indication of type of CPBRD value for a given unit of a video sequence, and sets a delta value as the CPBRD value for the given unit. The delta value for the given unit indicates a difference between the CPBRD value for the given unit and a CPBRD value of a preceding picture in decoding order. The encoder signals the delta value as the CPBRD value for the given unit (e.g., in a BP SEI message). The encoder also sets another CPBRD value for the given unit. For a first type of CPBRD value, the other CPBRD value indicates an increment value relative to a nominal CPB removal time of a preceding picture in decoding order that has a BP SEI message. For a second type of CPBRD value, the other CPBRD value for the given unit is not valid. The encoder signals the other CPBRD value for the given unit (e.g., in a PT SEI message).

The encoder can repeat the technique (1200) on a unit-by-unit basis (e.g., picture-by-picture basis). For the sake of simplicity, FIG. 12 does not show how the technique (1200) operates in conjunction with other encoding processes.

Figure 13:
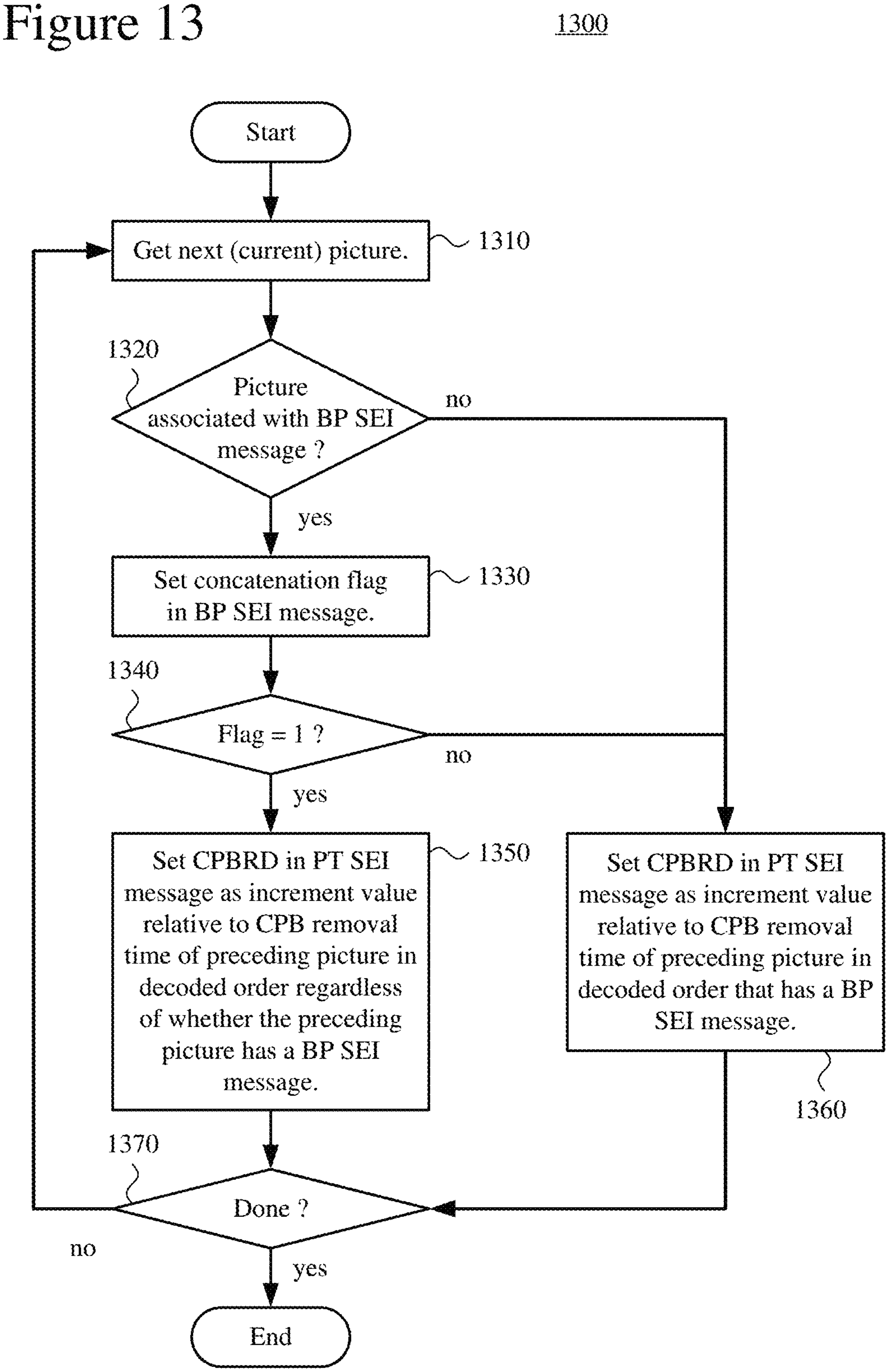
FIG. 13 is a flowchart illustrating an example technique for setting CPBRD values during encoding to simplify video splicing according to a single-value approach.

FIG. 13 shows an example technique (1300) for setting CPBRD values during encoding according to a single-value approach, when CPBRD values are set for pictures. A video encoder such as one described above with reference to FIG. 3 or other video encoder performs the technique (1300).

To start, the encoder gets (1310) the current picture in a video sequence. The encoder checks (1320) whether the current picture has a BP SEI message. If not, the encoder sets (1360) the CPBRD for the current picture in a PT SEI message as an increment value relative to the nominal CPB removal time of a preceding picture in decoding order that has a BP SEI message.

On the other hand, if the current picture has a BP SEI message, the encoder sets (1330) a concatenation flag value in a BP SEI message for the current picture. Depending on the value of the flag (1340), the encoder can set the CPBRD value for the current picture in different ways. If the flag is equal to 1, the encoder sets (1350) the CPBRD value for the current picture in a PT SEI message as an increment value relative to the nominal CPB removal time of the preceding picture in decoding order regardless of whether the preceding picture has a BP SEI message. Otherwise (the flag is equal to 0), the encoder sets (1360) the CPBRD for the current picture in a PT SEI message as an increment value relative to the nominal CPB removal time of a preceding picture in decoding order that has a BP SEI message.

The encoder checks (1370) whether it is done and, if not, continues with the next picture as the current picture. For the sake of simplicity, FIG. 13 does not show how the technique (1300) operates in conjunction with other encoding processes.

Figure 14:
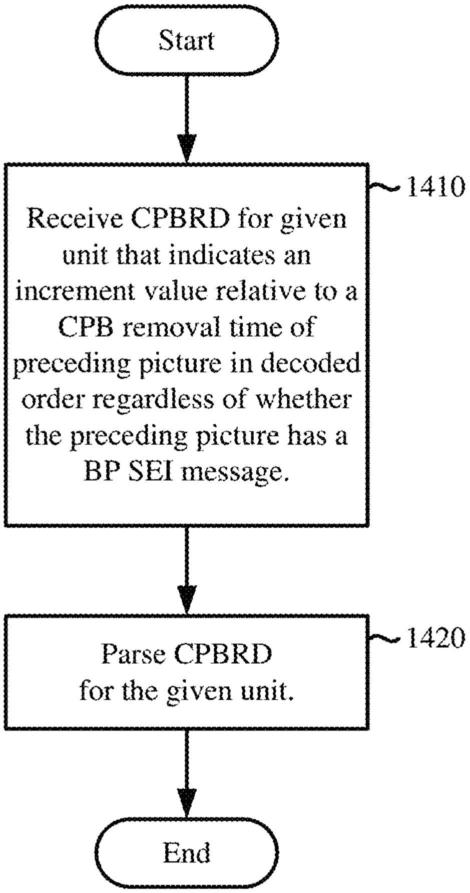
FIG. 14 is a flowchart illustrating a generalized technique for processing CPBRD values during decoding.

FIG. 14 shows a generalized technique (1400) for processing CPBRD values during decoding. A video decoder such as one described above with reference to FIG. 4 or other video decoder performs the technique (1400).

The decoder receives (1410) a CPBRD value for a given unit of a video sequence. For example, the given unit is an access unit for a picture that has a BP SEI message and can be a random access picture. Or, the given unit is a decoding unit for part of such a picture. The CPBRD value for the given unit indicates an increment value relative to a nominal CPB removal time of a preceding picture in decoding order regardless of whether the preceding picture has a BP SEI message. In some implementations, the preceding picture immediately precedes the given unit (or picture that includes the given unit) in decoding order. Alternatively, among pictures of the video sequence at the same temporal sub-layer as the given unit or at a lower temporal sub-layer, the preceding picture immediately precedes the given unit (or picture that includes the given unit) in decoding order. For example, when temporal sub-layering is considered, if the current picture has TemporalId equal to 0, the preceding picture is the preceding picture with TemporalId equal to 0.

The decoder parses (1420) the CPBRD value for the given unit. For example, the CPBRD value is parsed from a BP SEI message or PT SEI message associated with an access unit for a coded picture.

In some variations (e.g., two-value approaches), the decoder potentially receives and parses multiple CPBRD values for the given unit, which should be interpreted according to different conventions. For example, in addition to the CPBRD value set as an increment value relative to a nominal CPB removal time of a preceding picture in decoding order regardless of whether the preceding picture has a BP SEI message, the decoder receives and parses another CPBRD value for the given unit (e.g., from a PT SEI message for the given unit). The other CPBRD value for the given unit indicates an increment value relative to a nominal CPB removal time of a preceding picture in decoding order that has a BP SEI message. The decoder can also receive and parse one or more indications of whether each of the CPBRD values, respectively, is present or absent. Or, the decoder can receive and parse one or more indications of whether each of the CPBRD values, respectively, is valid or not valid.

In other variations (e.g., single-value approaches), the decoder receives and parses an indication of type of the CPBRD value for the given unit. For example, the indication of the type of the CPBRD value is parsed from a BP SEI message of the given unit or picture that includes the given unit. The indication of type of the CPBRD value indicates how to interpret the CPBRD value for the given unit, which can be parsed from a PT SEI message. For example, the decoder receives and parses an indication of type of CPBRD value for a given unit of a video sequence, then receives and parses the CPBRD value for the given unit. For a first type of CPBRD value, the CPBRD value for the given unit indicates an increment value relative to a nominal CPB removal time of a preceding picture in decoding order that has a BP SEI message. For a second type of CPBRD value, the CPBRD value for the given unit indicates an increment value relative to a nominal CPB removal time of a preceding picture in decoding order regardless of whether the preceding picture has a BP SEI message.

In still other variations (e.g., two-value approaches using a flag and delta value), the decoder receives and parses an indication of type of the CPBRD value for the given unit, and receives and parses a CPBRD value for the given unit that represents the delta value. For example, the indication of the type of the CPBRD value and the CPBRD value (delta value) are parsed from a BP SEI message of the given unit or picture that includes the given unit. Depending on the type of the CPBRD value, the CPBRD value for the given unit may be parsed from a PT SEI message. For example, the decoder receives and parses an indication of type of CPBRD value for a given unit of a video sequence, and receives and parses a delta value as the CPBRD value for the given unit (e.g., from a BP SEI message). The delta value for the given unit indicates a difference between the CPBRD value for the given unit and a CPBRD value of a preceding picture in decoding order. The decoder also receives and parses another CPBRD value for the given unit (e.g., from a PT SEI message). When valid, the other CPBRD value for the given unit indicates an increment value relative to a nominal CPB removal time of a preceding picture in decoding order that has a BP SEI message.

After parsing the CPBRD value for the given unit, the decoder can utilize the CPBRD value. For example, based at least in part on the CPBRD value for the given unit, the decoder can compute a nominal removal time from the CPB for the given unit.

The decoder can repeat the technique (1400) on a unit-by-unit basis (e.g., picture-by-picture basis). For the sake of simplicity, FIG. 14 does not show how the technique (1400) operates in conjunction with other decoding processes.

Figure 15:
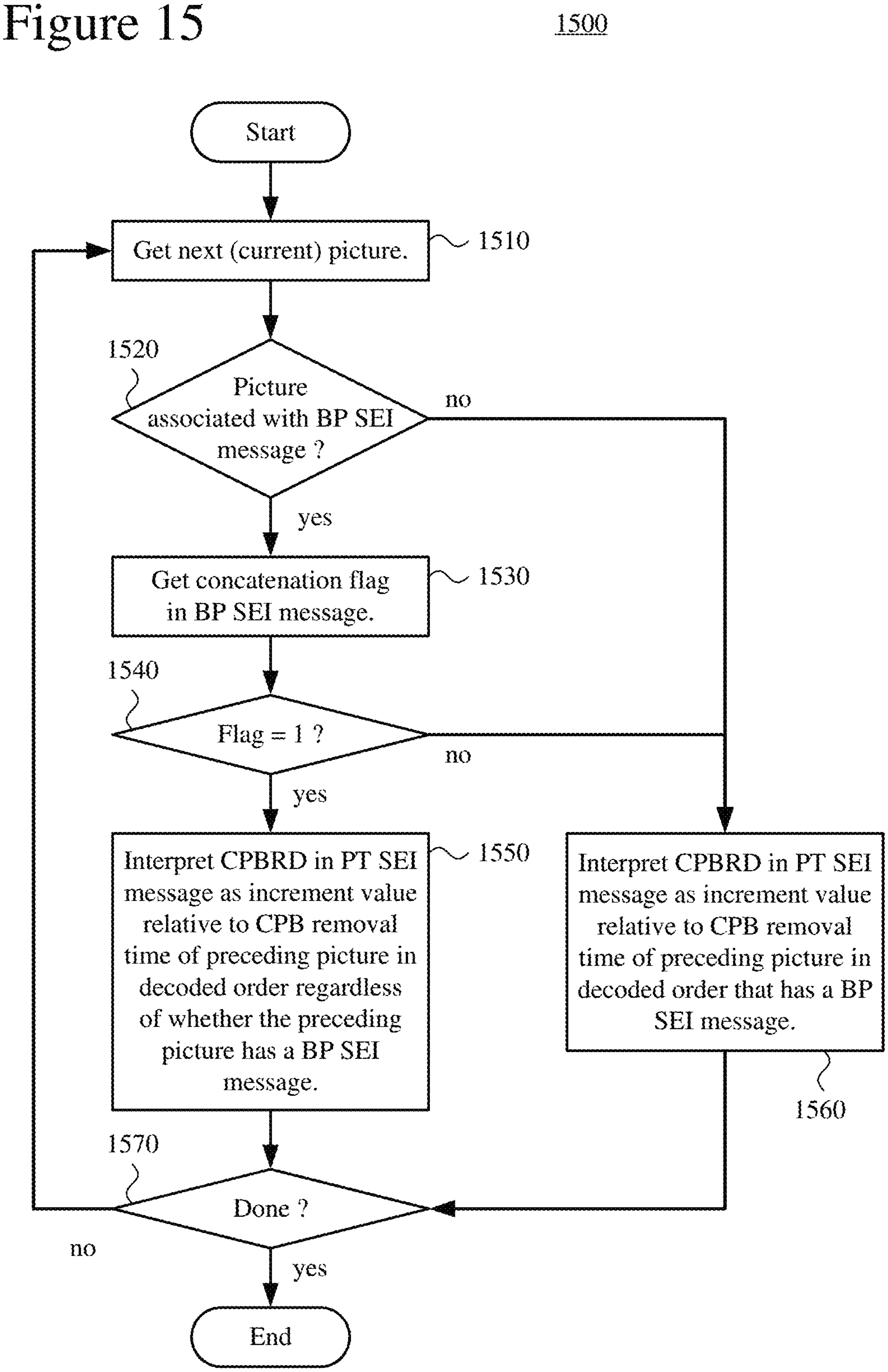
FIG. 15 is a flowchart illustrating an example technique for determining CPBRD values during decoding according to a single-value approach.

FIG. 15 shows an example technique (1500) for determining CPBRD values during decoding according to a single-value approach, when CPBRD values are set for pictures. A video decoder such as one described above with reference to FIG. 4 or other video decoder performs the technique (1500).

To start, the decoder gets (1510) the current picture in a video sequence. The decoder checks (1520) whether the current picture has a BP SEI message. If not, the decoder interprets (1560) the CPBRD for the current picture in a PT SEI message as an increment value relative to the nominal CPB removal time of a preceding picture in decoding order that has a BP SEI message.

On the other hand, if the current picture has a BP SEI message, the decoder gets (1530) a concatenation flag value in a BP SEI message for the current picture. Depending on the value of the flag (1540), the decoder can interpret the CPBRD value for the current picture in different ways. If the flag is equal to 1, the decoder interprets (1550) the CPBRD value for the current picture in a PT SEI message as an increment value relative to the nominal CPB removal time of the preceding picture in decoding order regardless of whether the preceding picture has a BP SEI message. Otherwise (the flag is equal to 0), the decoder interprets (1560) the CPBRD for the current picture in a PT SEI message as an increment value relative to the nominal CPB removal time of a preceding picture in decoding order that has a BP SEI message.

The decoder checks (1570) whether it is done and, if not, continues with the next picture as the current picture. For the sake of simplicity, FIG. 15 does not show how the technique (1500) operates in conjunction with other decoding processes.

Figure 16:
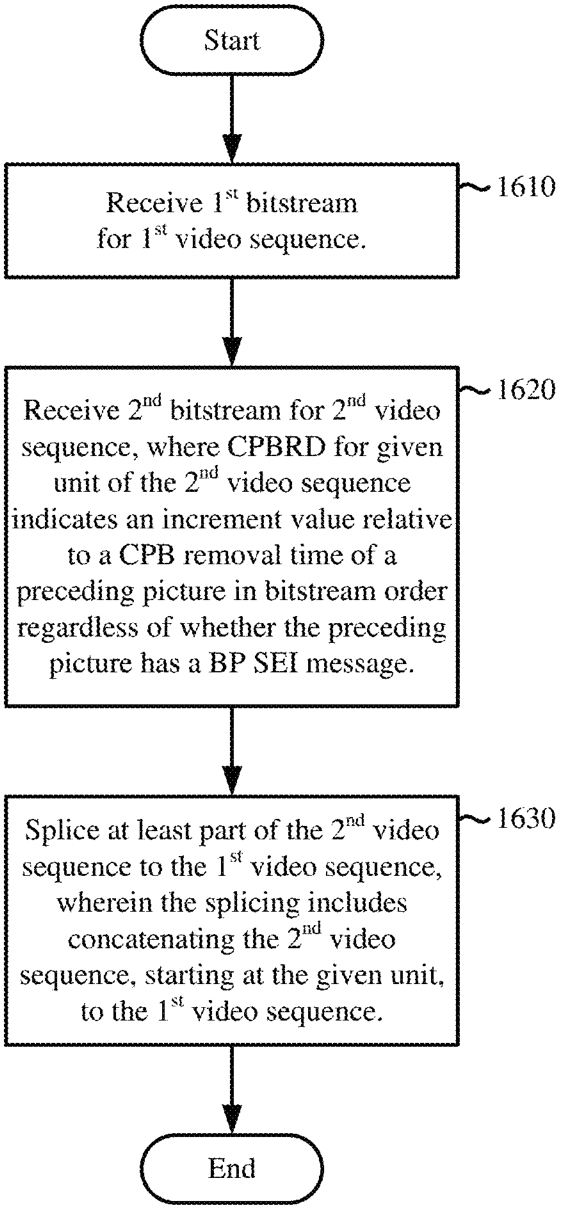
FIG. 16 is a flowchart illustrating a generalized technique for splicing bitstreams.

FIG. 16 shows a generalized technique (1600) for splicing bitstreams. A video splicing tool performs the technique (1600).

The splicing tool receives (1610) a first bitstream for a first video sequence and also receives (1620) a second bitstream for a second video sequence. A CPBRD value for a given unit of the second video sequence indicates an increment value relative to a nominal CPB removal time of a preceding picture in decoding order regardless of whether the preceding picture has a BP SEI message.

The splicing tool splices (1630) at least part of the second video sequence to the first video sequence. As part of the splicing, the splicing tool concatenates the second video sequence, starting at the given unit or picture that includes the given unit, to the first video sequence. For example, the splicing tool concatenates a BP SEI message of the given unit or picture that includes the given unit (wherein the BP SEI message includes an indication of type of the CPBRD value for the given unit and, in some variations, a first CPBRD value for the given unit) and a PT SEI message (wherein the PT SEI message includes the CPBRD value for the given unit or, in some variations, a second CPBRD value for the given unit).

In some implementations, the second CPBRD value (e.g., in a PT SEI message) for the given unit indicates an increment value relative to a nominal CPB removal time of a preceding picture in decoding order that has a BP SEI message. In this case, as part of the splicing, the splicing tool can discard the other, second CPBRD for the given unit or mark the other, second CPBRD for the given unit as not valid.

Figure 17:
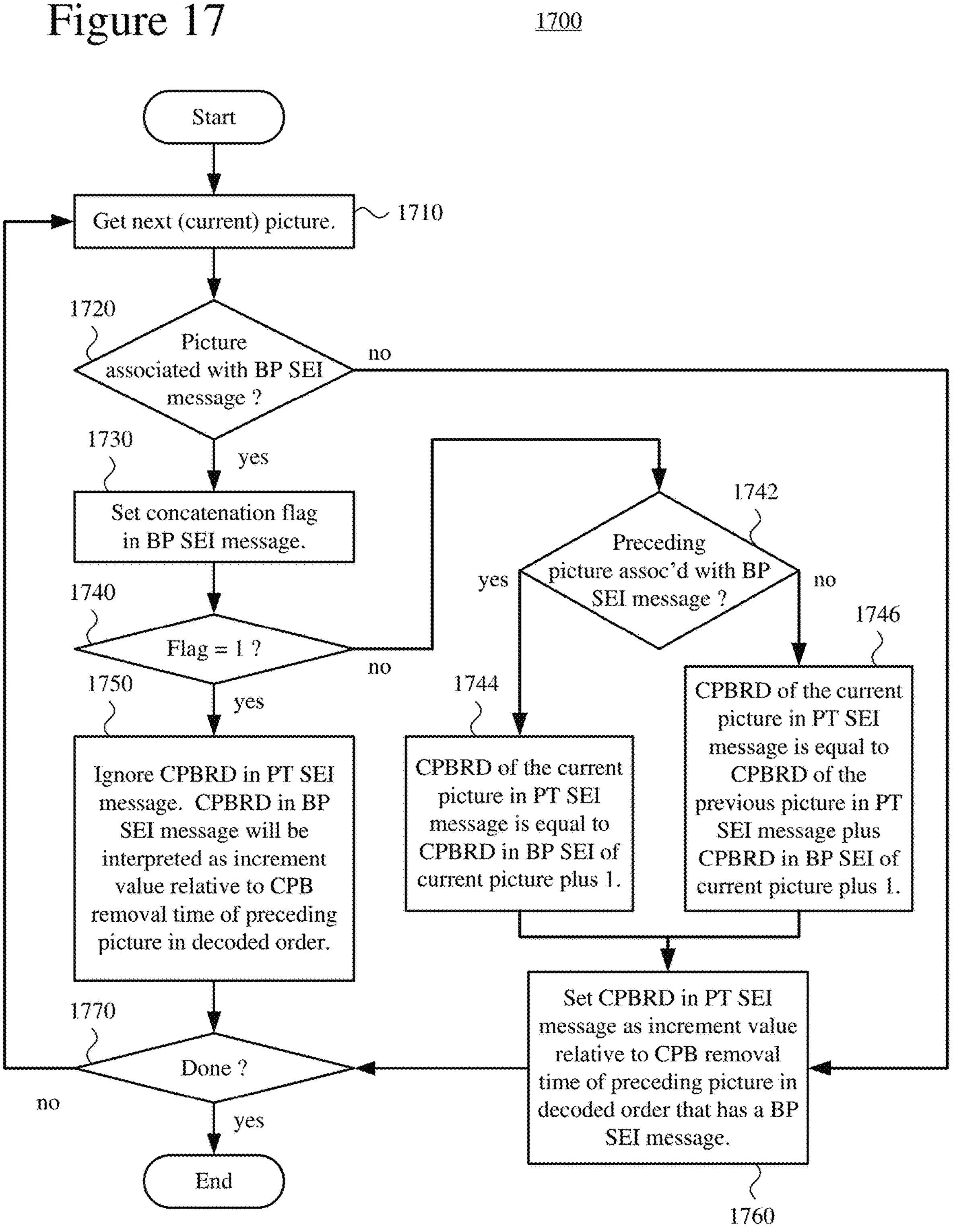
FIG. 17 is a flowchart illustrating an example technique for setting CPBRD values during encoding to simplify video splicing according to a two-value approach with flag and delta value.

FIG. 17 shows an example technique (1700) for setting CPBRD values during encoding according to a two-value approach using a flag and delta value, when CPBRD values are set for pictures. A video encoder such as one described above with reference to FIG. 3 or other video encoder performs the technique (1700).

To start, the encoder gets (1710) the current picture in a video sequence. The encoder checks (1720) whether the current picture has a BP SEI message. If not, the encoder sets (1760) the CPBRD value for the current picture in a PT SEI message as an increment value relative to the nominal CPB removal time of a preceding picture in decoding order that has a BP SEI message.

On the other hand, if the current picture has a BP SEI message, the encoder sets (1730) a concatenation flag value in a BP SEI message for the current picture. Depending on the value of the flag (1740), the encoder can set the CPBRD value for the current picture in different ways.

If the flag is equal to 1, the encoder sets (1750) the CPBRD value for the current picture in a PT SEI message to have any value, since the CPBRD value for the current picture in the PT SEI message will be ignored. A CPBRD value (delta value) in the BP SEI message for the current picture will be interpreted as an increment value relative to the nominal CPB removal time of the preceding picture in decoding order.

Otherwise (the flag is equal to 0), the encoder checks (1742) if the preceding picture in decoding order has a BP SEI message. If so, the encoder sets (1744) the CPBRD value in the BP SEI message of the current picture such that the CPBRD value of the current picture in its PT SEI message is equal to the CPBRD value in the BP SEI message of the current picture plus 1. If not (preceding picture does not have a BP SEI message), the encoder sets (1746) the CPBRD value in the BP SEI message of the current picture such that the CPBRD value of the current picture in its PT SEI message is equal to the CPBRD value of the previous picture in its PT SEI message plus the CPBRD value (delta value) in the BP SEI message of the current picture plus 1. The encoder also sets (1760) the CPBRD value for the current picture in a PT SEI message as an increment value relative to the nominal CPB removal time of the preceding picture in decoding order that has a BP SEI message.

The encoder checks (1770) whether it is done and, if not, continues with the next picture as the current picture. For the sake of simplicity, FIG. 17 does not show how the technique (1700) operates in conjunction with other encoding processes.

Figure 18:
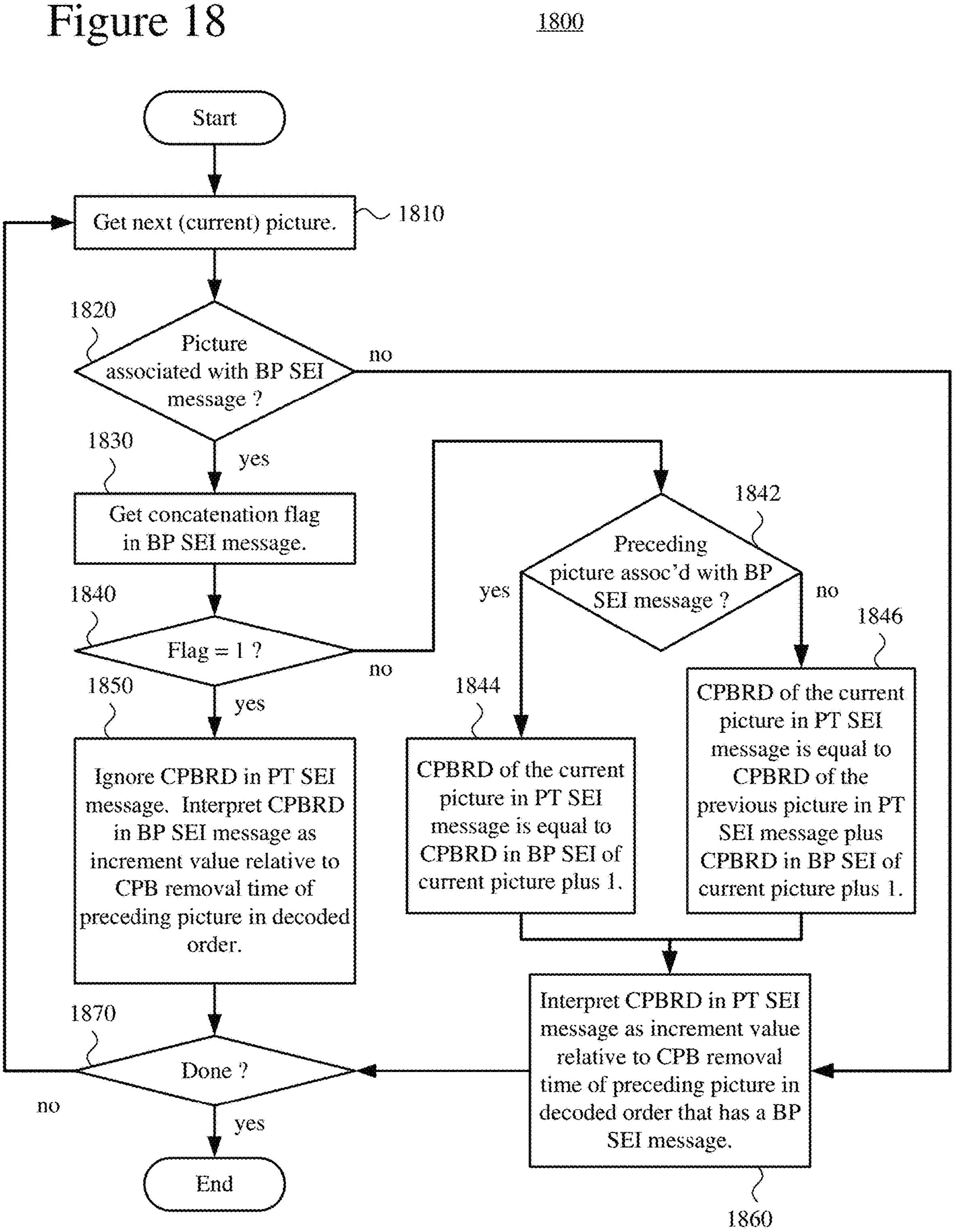
FIG. 18 is a flowchart illustrating an example technique for determining CPBRD values during decoding according to a two-value approach with flag and delta value.

FIG. 18 shows an example technique (1800) for determining CPBRD values during decoding according to a two-value approach using a flag and delta value, when CPBRD values are set for pictures. A video decoder such as one described above with reference to FIG. 4 or other video decoder performs the technique (1800).

To start, the decoder gets (1810) the current picture in a video sequence. The decoder checks (1820) whether the current picture has a BP SEI message. If not, the decoder interprets (1860) the CPBRD value for the current picture in a PT SEI message as an increment value relative to the nominal CPB removal time of a preceding picture in decoding order that has a BP SEI message.

On the other hand, if the current picture has a BP SEI message, the decoder gets (1830) a concatenation flag value in a BP SEI message for the current picture. Depending on the value of the flag (1840), the decoder can interpret the CPBRD value for the current picture in different ways, or even ignore the CPBRD value for the current picture.

If the flag is equal to 1, the decoder ignores (1850) the CPBRD value for the current picture in a PT SEI message. A CPBRD value (delta value) in the BP SEI message for the current picture is interpreted as an increment value relative to the nominal CPB removal time of the preceding picture in decoding order.

Otherwise (the flag is equal to 0), the decoder checks (1842) if the preceding picture has a BP SEI message. If so, the decoder can verify (1844) that the CPBRD value of the current picture in its PT SEI message is equal to the CPBRD value in the BP SEI message of the current picture plus 1. If not (preceding picture does not have a BP SEI message), the decoder can verify (1846) that the CPBRD value of the current picture in its PT SEI message is equal to the CPBRD value of the previous picture in its PT SEI message plus the CPBRD value (delta value) in the BP SEI message of the current picture plus 1. The decoder also interprets (1860) the CPBRD value for the current picture in a PT SEI message as an increment value relative to the nominal CPB removal time of the preceding picture in decoding order that has a BP SEI message.

The decoder checks (1870) whether it is done and, if not, continues with the next picture as the current picture. For the sake of simplicity, FIG. 18 does not show how the technique (1800) operates in conjunction with other decoding processes.

H. Variations and Alternatives

The detailed description includes many examples of syntax and semantics for SEI messages. In some cases, these examples generally follow the form of SEI messages used in the H.264/AVC standard and/or the HEVC standard. More generally, the term “SEI message” or “VUI message” indicates any set of syntax elements associated with coded video data that conveys at least some information equivalent to the information carried in the syntax structure(s) of an example SEI or VUI message described herein, regardless of whether such syntax elements are signaled using the SEI or VUI syntax specified in the referenced H.264/AVC standard or HEVC standard, are signaled in other syntax within the coded video bitstream, or are signaled by some other means.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A computer system comprising one or more processing units and memory, wherein the computer system implements a video decoder configured to perform operations comprising:

receiving a concatenation flag and a coded picture buffer removal delay (“CPBRD”) delta value signaled as part of a supplemental enhancement information message associated with a given access unit, the concatenation flag having a given value;

receiving encoded data in a bitstream for a given decoding unit of the given access unit, the given access unit corresponding to a current picture among pictures of a video sequence, wherein the given decoding unit is a subset of the current picture;

determining a nominal coded picture buffer (“CPB”) removal time of a preceding access unit based on a nominal CPB removal time of a last decoding unit of the preceding access unit, the preceding access unit corresponding to a preceding picture among the pictures of the video sequence, wherein the last decoding unit is a subset of the preceding picture;

determining a value of a constraint that ensures that delay is at least as long as delay would be if decoding started at the given access unit; and determining a nominal CPB removal time based at least in part on a sum of (a) the nominal CPB removal time of the preceding access unit and (b) a product of a clock tick value and a factor, wherein the factor depends on the higher of the CPBRD delta value and the value of the constraint.

2. The computer system of claim 1, wherein the given decoding unit of the given access unit is a slice of the current picture.

3. The computer system of claim 1, wherein the current picture is a random access picture.

4. The computer system of claim 1, wherein the last decoding unit of the preceding access unit is a slice of the preceding picture.

5. The computer system of claim 1, wherein the CPBRD delta value is signaled as a syntax element representing the CPBRD delta value minus 1.

6. The computer system of claim 1, wherein the determining the value of the constraint includes combining an initial coded picture buffer removal delay value, divided by 90000, with a final arrival time of the preceding access unit and the nominal CPB removal time of the preceding access unit.

7. The computer system of claim 6, wherein the determining the value of the constraint further includes dividing a result of the combining by the clock tick value.

8. The computer system of claim 1, wherein the value of the constraint is determined as Ceil((InitiCpbRemovalDelay [SchedSelIdx]÷90000+$t_{af}(n_b)-t_{r,n}(n_b)$)÷$t_c$), wherein Ceil( ) is a ceiling function, wherein InitiCpbRemovalDelay [SchedSelIdx] represents an initial coded picture buffer removal delay value, wherein $t_{af}(n_b)$ represents a final arrival time of the preceding access unit, wherein $t_{r,n}(n_b)$ represents the nominal CPB removal time of the preceding access unit, and wherein $t_c$ represents the clock tick value.

9. The computer system of claim 1, wherein:

the current picture is part of a temporal layer, and the preceding picture immediately precedes the current picture in decoding order in the temporal layer of the current picture or a lower temporal layer.

10. The computer system of claim 1, wherein:

the preceding picture, among pictures having a temporal identifier of zero, immediately precedes the current picture in decoding order.

11. The computer system of claim 1, wherein the concatenation flag and the CPBRD delta value are for the given access unit.

12. In a computer system comprising one or more processing units and memory, a method comprising:

receiving encoded data in a bitstream for a current decoding unit of a first access unit of a buffering period, the first access unit corresponding to a first picture among pictures of a video sequence, wherein the current decoding unit is a current slice of the first picture; and decoding the current decoding unit using the encoded data and a coded picture buffer removal delay ("CPBRD") value for the current decoding unit, including calculating a nominal coded picture buffer ("CPB") removal time for the current decoding unit relative to a nominal CPB removal time for a last decoding unit of a second access unit of the buffering period, the second access unit corresponding to a second picture among the pictures of the video sequence, wherein the last decoding unit is a last slice of the second picture, and wherein the calculating the nominal CPB removal time for the current decoding unit includes:

calculating the nominal CPB removal time for the last decoding unit of the second access unit, wherein the nominal CPB removal time for the last decoding unit of the second access unit depends on a nominal CPB removal time for the second access unit, the nominal CPB removal time for the second access unit having been previously calculated based at least in part on a sum of (a) a nominal CPB removal time of a third access unit of the buffering period and (b) a first product of a first clock tick value and a first factor, wherein the first factor depends on a CPBRD value for the second access unit that is signaled as part of a picture timing supplemental enhancement information message for the second access unit;

calculating a second product of a second clock tick value and a second factor, the second factor depending on the CPBRD value for the current decoding unit; and adjusting the nominal CPB removal time for the last decoding unit of the second access unit by the second product.

13. The method of claim 12, wherein the third access unit corresponds to a third picture among the pictures of the video sequence, wherein the third picture precedes the second picture in the video sequence, and wherein the first picture follows the second picture in the video sequence.

14. The method of claim 13, wherein:

the second picture is part of a temporal layer, and the third picture immediately precedes the second picture in decoding order in the temporal layer of the second picture or a lower temporal layer; or the third picture, among pictures having a temporal identifier of zero, immediately precedes the second picture in decoding order.

15. The method of claim 12, wherein the third access unit corresponds to a third picture among the pictures of the video sequence, wherein the third picture precedes the second picture in the video sequence, and wherein the first picture is the second picture.

16. The method of claim 15, wherein:

the second picture is part of a temporal layer, and the third picture immediately precedes the second picture in decoding order in the temporal layer of the second picture or a lower temporal layer; or the third picture, among pictures having a temporal identifier of zero, immediately precedes the second picture in decoding order.

17. A computer system comprising:

one or more processing units; and memory having stored thereon encoded data in a bitstream for a current decoding unit of a first access unit of a buffering period, the first access unit corresponding to a first picture among pictures of a video sequence, wherein the current decoding unit is a current slice of the first picture, the encoded data being organized to facilitate decoding of the current decoding unit using the encoded data and a coded picture buffer removal delay ("CPBRD") value for the current decoding unit with operations comprising calculating a nominal coded picture buffer ("CPB") removal time for the current decoding unit relative to a nominal CPB removal time for a last decoding unit of a second access unit of the buffering period, the second access unit corresponding to a second picture among the pictures of the video sequence, wherein the last decoding unit is a last slice of the second picture, and wherein the calculating the nominal CPB removal time for the current decoding unit includes:

calculating the nominal CPB removal time for the last decoding unit of the second access unit, wherein the nominal CPB removal time for the last decoding unit of the second access unit depends on a nominal CPB removal time for the second access unit, the nominal CPB removal time for the second access unit having been previously calculated based at least in part on a sum of (a) a nominal CPB removal time of a third access unit of the buffering period and (b) a first product of a first clock tick value and a first factor, wherein the first factor depends on a CPBRD value for the second access unit that is signaled as part of a picture timing supplemental enhancement information message for the second access unit;

calculating a second product of a second clock tick value and a second factor, the second factor depending on the CPBRD value for the current decoding unit; and adjusting the nominal CPB removal time for the last decoding unit of the second access unit by the second product.

18. The computer system of claim 17, wherein the third access unit corresponds to a third picture among the pictures of the video sequence, wherein the third picture precedes the second picture in the video sequence, and wherein the first picture follows the second picture in the video sequence.

19. The computer system of claim 17, wherein the third access unit corresponds to a third picture among the pictures of the video sequence, wherein the third picture precedes the second picture in the video sequence, and wherein the first picture is the second picture.

20. The computer system of claim 17, wherein the CPBRD value for the current decoding unit is signaled as part of a picture timing supplemental enhancement information message for the first access unit.

* * * * *